(12) United States Patent
Lahmi

(10) Patent No.: US 9,277,097 B2
(45) Date of Patent: Mar. 1, 2016

(54) METHOD FOR AUTHENTICATING A DOCUMENT

(71) Applicant: Paul Lahmi, Paris (FR)

(72) Inventor: Paul Lahmi, Paris (FR)

( * ) Notice: Subject to any disclaimer, the term of this patent is extended or adjusted under 35 U.S.C. 154(b) by 0 days.

(21) Appl. No.: 14/374,779

(22) PCT Filed: Jan. 24, 2013

(86) PCT No.: PCT/IB2013/050608
§ 371 (c)(1),
(2) Date: Oct. 15, 2014

(87) PCT Pub. No.: WO2013/111082
PCT Pub. Date: Aug. 1, 2013

(65) Prior Publication Data
US 2015/0043025 A1    Feb. 12, 2015

(30) Foreign Application Priority Data
Jan. 26, 2012   (FR) .................................... 12 50742

(51) Int. Cl.
*G06K 15/00* (2006.01)
*H04N 1/44* (2006.01)
(Continued)

(52) U.S. Cl.
CPC ................. *H04N 1/44* (2013.01); *G06F 21/30* (2013.01); *G06F 21/6209* (2013.01);
(Continued)

(58) Field of Classification Search
CPC ......... G06F 21/30; G06F 21/64; G06Q 10/10; H04N 1/44; H04N 1/321; H04N 2201/3233; H04N 2201/3278; H04N 2201/3274

USPC ........ 358/1.13, 1.14, 1.15, 1.18, 402; 705/50, 705/57, 58; 382/100
See application file for complete search history.

(56) References Cited

U.S. PATENT DOCUMENTS 7,299,408 B1 * 11/2007 Daconta et al. ............... 715/234
7,389,273 B2 *  6/2008 Irwin et al. ..................... 705/59
(Continued)

FOREIGN PATENT DOCUMENTS

| EP | 1432234 | 6/2004 |
|---|---|---|
| WO | 9631049 | 10/1996 |

(Continued)

OTHER PUBLICATIONS

Corresponding International Search Report PCT/IB2013/050608 dated May 13, 2013.

*Primary Examiner* — Gabriel Garcia
(74) *Attorney, Agent, or Firm* — The Belles Group, P.C.

(57) ABSTRACT

A method for authenticating a document comprising the following steps:
- when creating an original document, said document is sent by a holding entity to an authentication management entity in order for said document to be stored at a secure storage site and for any delivery of an authenticated copy and/or authenticatable copy to be managed by the authentication management entity,
- when a request for an authenticated copy is made by a requesting entity, the holding entity makes a duplication request via a suitable duplication system controlled by the authentication management entity in order to obtain an authenticatable transmission copy,
- the requesting entity uses the authenticatable transmission copy to make a duplication request via a suitable duplication system in order to obtain an authenticated copy delivered under the control of the authentication management entity.

38 Claims, 14 Drawing Sheets

(51) Int. Cl.
*G06F 21/64* (2013.01)
*H04N 1/32* (2006.01)
*G06F 21/30* (2013.01)
*G06F 21/62* (2013.01)
*G06Q 10/10* (2012.01)
*G06F 3/12* (2006.01)

(52) U.S. Cl.
CPC .............. *G06F 21/64* (2013.01); *G06Q 10/10* (2013.01); *H04N 1/32101* (2013.01); *H04N 2201/3233* (2013.01); *H04N 2201/3274* (2013.01); *H04N 2201/3278* (2013.01)

(56) References Cited

U.S. PATENT DOCUMENTS

2006/0279761 A1* 12/2006 Wang et al. .................. 358/1.14
2011/0225417 A1* 9/2011 Maharajh et al. ............. 713/150

FOREIGN PATENT DOCUMENTS

WO  0019295  4/2000
WO  0057279  9/2000

* cited by examiner

Figure 6

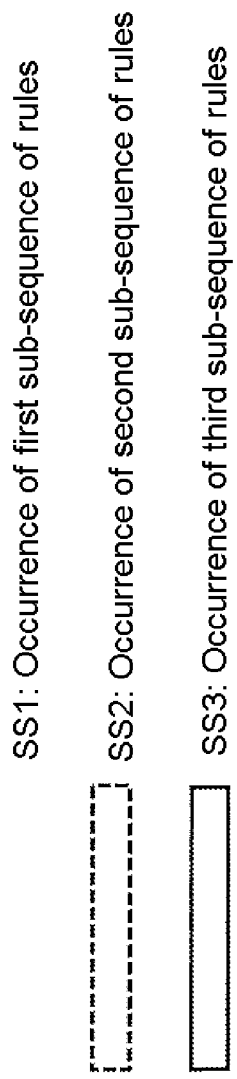

SS1: Occurrence of first sub-sequence of rules

SS2: Occurrence of second sub-sequence of rules

SS3: Occurrence of third sub-sequence of rules

Lorem ipsum dolor sit amet, consectetuer adipiscing elit. Maecenas porttitor congue massa. Fusce posuere, magna sed pulvinar ultricies, purus lectus malesuada libero, sit amet commodo magna eros quis urna. Nunc viverra imperdiet enim. Fusce est. Vivamus a tellus. Pellentesque habitant morbi tristique senectus et netus et malesuada fames ac turpis egestas. Proin pharetra nonummy pede. Vivamus a mi. Morbi neque. Aliquam erat volutpat. Integer ultrices lobortis eros.

METHOD FOR AUTHENTICATING A DOCUMENT

The invention relates to a method ensuring the delivery of authenticated copies of an original document by virtue of the use of authenticatable copies. It is in furtherance of a previous invention which itself relates to the notion of authenticatable documents consisting when printing the original in storing an electronic image of the latter on a server managed by the issuer of the document, the link between the two documents is ensured by two additional graphical elements dubbed mark and rules inserted into the printed original document.

This previous invention also deals with the notion of conventional document which does not comprise any mark and which is therefore reproduced freely without making it necessary to utilize rules inserted into the document. Sensitive documents comprise marks and within the framework of reproduction complying with the method defined in this previous patent, reproduction is activated solely after extraction and utilization of the rules so as to ascertain the possibilities and restrictions of reproduction that are linked with this document. Although our earlier patent defines four main types of sensitive documents, the present patent is concerned only with sensitive documents of authenticatable type. The originality of the present invention is to propose an authentication chain which although reusing the achievements of our previous patent proposes a more complete and novel method making it possible to create an entirely novel authentic information transmission chain.

The present patent thus introduces numerous novel characteristics by introducing in particular a unique ownership of the original documents in electronic owned in a secure storage site or safe managed by an authentication manager. All the documents which circulate outside of this safe are merely copies with various levels and characteristics of authentication. The transmission chain created by this novel invention allows any entity which has to introduce authenticated data into its information system to do so through a direct linkage with the safe, this exchange being managed in advance and in an accurate manner by the initial recipient of this information.

We must firstly define the various types of documents impacted by our invention, in particular we can make a first distinction by considering the medium used:

A material document is a document in its form printed on a medium akin to paper by any existing or future technical means such as, and in a nonlimiting manner, offset printing and/or printing obtained by a printer driven by an information system optionally supplemented with additional elements such as hand-written elements as well as any combination of these means. The medium may either be standard paper or any other medium able to support such printing so as to obtain a physical document. The format does not have any bearing on this definition: a document with A4 or A3 format (European standard format), letter format (American standard format) as well as any other standard or non-standard format, single-sided or double-sided or composed of several sheets or indeed a book remains a paper document, including if the support (medium) has nothing to do with paper: synthetic or metallic material or any composition An electronic document unlike a material document is intangible. It is either:

In the form of a computer file in a directly viewable format such as the PDF format and such that the printing of this document produces a material document visually identical to this document when it is viewed on a computer type screen. In a nonlimiting manner the associated screen or one driven by a fixed or portable computer or of mobile tablet format as well as any other screen managed by computerized intelligence such as the screens of intelligent telephones—Smartphones.

In the form of a file of declarative type, such for example an XML file, which in this case comprises a certain number of data and of formatting instructions. These elements can either be defined explicitly in the file or in an implicit manner via a call to external data systems and the use of tailored algorithms. By extrapolation, a document can be limited to a collection of information on condition that a computerized intelligence is capable through tailored algorithms of producing either a viewable electronic document such as defined previously or a material document such as defined previously by supplementing these data with complementary data and/or defined formatting operations, managed by this computerized intelligence and/or by one or more third-party information systems in conjunction therewith.

A document viewed on a computer screen is both akin to a material document when it is associated with its screen support and an electronic document when it is associated with a file of computer or equivalent type as defined hereinabove. Thus a document viewed on any type of screen is a material document when it is for example captured in a photograph or video by a device such as an intelligent telephone for example. It is on the other hand considered to be an electronic document when the user who views it decides to save it or to transmit it via an information system.

Likewise we can define what the various copies are that can be obtained on the basis of a document by introducing two particular notions linked with our invention:

Simple copies, these copies do not afford any guarantee of authenticity to their owner apart from the latter's trust in the transmission chain which enabled him to acquire this copy.

Authenticated copies, these copies within the framework of our invention are copies whose authenticity is guaranteed by our invention in particular through the process of delivery of these copies. In the prior art, including in the use of a complex system of documentary management and electronic safes, authenticity is guaranteed by complex encryption technologies (sealing, electronic signature) or by secure transmission chains with possible introduction of trusted third-parties. However in these technologies, the final acquisition of an authentic document by its recipient is desynchronized with its creation, thereby enabling this chain to be imperiled by artful forgers.

Authenticatable copies, these copies allow their owner to allow the obtaining and/or the dissemination of authenticated copies or indeed of authenticatable copies, it being possible for the two characteristics to be compounded, to a third-party. This may be carried out on the basis of a material document and/or of an electronic document. Our invention makes it possible for the nature of the information disseminated and its dissemination to be controlled perfectly in this process as a function of the actual desire of the owner, something which the current state of the art does not make possible.

Thus we can reuse the definitions of our previous patent, tailoring them to suit the particular context of the present invention.

The mark element allows a reproduction system incorporating a tailored technology to detect the sensitive character of the document submitted for reproduction. Within the framework of our previous invention, four types of sensitive documents have been defined, authenticatable documents being one of these four categories.

According to an embodiment of the present invention, authenticatable documents represent the only type of sensitive documents incorporating the mark element; in this case, there is equivalence between sensitive document and authenticatable document. Within the framework of the present invention, an authenticatable document is necessarily an authenticatable copy since the originals are never submitted for direct reproduction since they are kept in safes. Only the term authenticatable copy will be used subsequently instead of authenticatable document.

According to another embodiment of the present invention, there may be multiplicity of definitions of marks without, however, this substituting for the rules. A mark makes it possible just to characterize a document as a sensitive document. In this embodiment, one or more definitions of marks may be reserved exclusively for authenticatable copies. In this case the detection of one of these definitions makes it possible to determine that the document is an authenticatable copy. The restrictions on obtaining copies, and particularly authenticated copies, are then defined by extraction and interpretation of the rules. The various types of marks may also be tailored to the type of the document: the mark on a document which comprises only text may be different from that which comprises only images.

In the case of a material document, the marks are graphical elements incorporated into the general graphic design of the document and which are able to be detected after a phase of digitization of this document and by direct searching through the result of this digitization. The digitization of a paper document consists in modeling a document as a set of points or equivalents with particular attributes for each of them such as color attributes. The result of this digitization makes it possible to transform this material document into an electronic document that can form the subject of tailored computerized processing operations such as for example the possibility of viewing this document on a computer type screen. There exist today numerous schemes for modeling a material document after digitization, it is possible to cite in a nonlimiting manner the following formats: TIFF, JPEG, PDF.

In the case of an electronic document, the mark can be incorporated as a specific attribute such as for example the definition of a computing value stored in the body of the electronic document or in a dedicated area. It can also be defined as a particular variation of the data stored in the document such as for example:

The use of a particular font or of certain particular characters possessing graphic designs similar to standard characters but slightly deformed and using a specific position in the font. In the case of image incorporation, particular modifications of the encoding of the image which do not modify or hardly modify the viewing of the latter but are detectable by a particular algorithm (graphical watermarking technique).

Any modification of the encoding of the document which hardly modifies, if at all, the viewing of the actual document or its printing.

In all the aforementioned examples, the insertion of the marks into the electronic document is performed in such a way that during the printing of this document, these marks produce marks in graphical form in the material document obtained with a standard printing process. In a particular embodiment of the invention, the obtaining of a material document possessing marks on the basis of an electronic document incorporating marks is carried out with a printing process specific to the invention.

The rules element allows the reproduction system to define the rules and restrictions of reproduction that are associated with the document submitted for reproduction. In the case of the authenticatable copies, this information may include, non-exclusively, referencing information making it possible to ascertain the previously stored information associated with the document submitted for reproduction allowing the production of an authenticated copy within the limits and restrictions which are attached thereto, the rules can also be defined in a manner complementary to the other referencing elements conventionally inserted into the document in the form for example of barcodes in one or two dimensions, or indeed data inserted in visually utilizable form such as a contract number. Let us recall that the reference of a document conventionally defined in an entity makes it possible to reference only the actual original but definitely not copies thereof especially in an authentication delivery context such as defined in the present invention.

Any information of computerized type, that is to say that is able to be processed by an algorithm of computerized type so as to allow this algorithm to respond to a request for reproduction on an authenticatable document so as to obtain one or more authenticatable copies and/or one or more authenticated copies, as will be defined hereinafter in the patent, is dubbed rules subsequently. These rules are defined graphically on a material document. For an electronic document, they are defined freely on condition that any obtaining of an authenticatable material document on the basis of this medium incorporates rules defined graphically with a standard printing process. In a particular embodiment of the invention, the obtaining of a material document possessing rules on the basis of an electronic document incorporating rules is carried out with a printing process specific to the invention.

When an authenticated copy incorporates mark and rules, this copy can then be considered to be an authenticatable copy since it makes it possible to have information feedback on the part of the complete system constituted by our invention.

The marks and the rules may either be two completely distinct elements or be merged into one and the same overall element on condition that the corresponding detection algorithm can detect the sensitive character of the document which is associated with the detection of the marks prior to the detection and the decoding/decryption of the rules in independent steps. The algorithm must thus be able to detect that the document is "sensitive" even in the case of fruitless decoding/decryption of the rules, or indeed of unsuccessful detection of the latter.

In the case of a material document, these elements are graphical, that is to say inserted into the graphic design of the printed document by using the same printing techniques as for the useful part of the document (text, graphical, images, etc.).

This mechanism also applies to an electronic document. For an electronic document, the marks and the rules are materialized either by data of computing type or by modifications and/or alterations thereof corresponding after printing to graphical elements on condition that these modifications and/or alterations can be processed and/or decoded and/or decrypted by an algorithm of computing type.

The aim of the present method is, by relying inter alia on the achievements of these patents, to widen the applications of making secure during the transmission of authenticatable copies by authorizing the real or virtual possessor of an authenticatable copy to transmit all or some of the present or future information attached to this document in accordance with the constraints that he will be able to define and control accurately. The patent endeavoring to ensure that the defined constraints are complied with in any use by a third-party of the documents and/or information transmitted.

The fact of being able to parametrize the accessibility of the information accessible on the basis of the transmission of a document in a context of authentication is novel, in particular the fact that on the basis of the possession and/or of access to an authenticatable copy, an owner can transmit a copy specific to a third-party whose possibilities of use and of transmission of information upon receipt of this document and a posteriori may be specifically defined by the latter as a function of his own wishes for dissemination and of those of the third-party, the mechanisms of use of the document transmitted complying with these definitions. The copy thus produced instead of being inert is the vector for transferring information under complete control of the issuer of the original document and of the orderer of the copy. Several apparently identical copies of one and the same original document may thus all be different at the information transmission level.

The documents concerned are for example all the administrative documents emanating from an administration as well as any document produced by a public or private enterprise, whether these documents are produced in paper document and/or electronic document form. By way of nonlimiting example may be cited:
 bills, order forms,
 pay slips, contracts,
 certificates, tax documents, accounting documents,
 medical documents,
 technical documents, directions for use and user manuals
 etc.

DEFINITIONS

Subsequently, to simplify the description of the invention, we give the following definitions complementary to the previous definitions which also include essential characteristics of the invention:
 Any document considered by its creator or by its possessor to be one and the same document, be it material document or electronic document, is dubbed in an overall manner a unitary document subsequently.
 Any storage system which affords a guarantee of authenticity of the information stored whatever organization manages it and independently of the level of security and of guarantee of authenticity afforded this storage is dubbed a safe subsequently. One of the aims of this invention is that any authentication delivered by such a safe can be considered to be infallible, including in the complex authentication models accessible through the invention.
 Any electronic document stored in a safe with an aim of obtaining authentications thereof, such as this will be defined in the invention, is dubbed an original document subsequently. The consequence of this, within the framework of the invention, is that any material document is not an original document but can potentially be authenticated or authenticatable according to the definitions which are provided hereinafter.
 The issuer of an original document is dubbed subsequently the issuing entity. This notion includes the actual issuer of the original document as well as any third-party organization managing this action for the latter.
 Any entity which manages a safe containing original documents with a view to delivering copies of these original documents to one or more entities with a guarantee of authenticity is dubbed an authentication management entity subsequently. One of the aims of the present invention is to guarantee this authenticity. The authentication management entity may or may not be one and the same as the issuing entity.
 For each original document, the authentication management entity can deliver several types of copies. The various types of copies enumerated hereinafter can be delivered either in material document form or in electronic document form. The notion of copy, in particular in terms of content as compared with that of the corresponding original document is defined in the invention. As indicated previously, the various types of copies are:
 Simple copies, these copies are produced on the basis of an original document but does not afford its owner any guarantee of authenticity apart from the latter's trust in the transmission chain which enabled him to acquire this copy.
 Authenticated copies, these copies are produced by the authentication management entity on the basis of an original document and the authenticity of the authenticated copy is guaranteed by the authentication management entity according to a mode specific to the invention and which will be described hereinafter. The mode of obtaining such a copy will also be described in the invention. A simple copy is not an authenticated copy.
 Authenticatable copies, these copies are produced by the authentication management entity and allow their owner to request new copies whether the latter be simple copies, authenticated copies or authenticatable copies. The notion of authenticated copy is independent of the notion of authenticatable copy: an authenticated copy may or may not be an authenticatable copy just as an authenticatable copy may or may not be an authenticated copy. A simple copy is not an authenticatable copy. It is necessary to distinguish in this category the authenticatable copies making it possible itself to obtain other authenticatable copies with identical or different characteristics to the authenticatable original copy from those making it possible to obtain authenticated copies only. The former, those making it possible to obtain other authenticatable copies, in general reserved for the owning units such as will be defined hereinafter, are dubbed authenticatable ownership copies. The others, those only permitting authenticated copies to be obtained, are dubbed authenticatable transmission copies. An authenticatable copy incorporates marks and rules as was defined previously, in particular as a function of the type of document: material document or electronic document.
 Any authenticatable copy possesses an inherent identity defined by the information contained in the rules and in particular the referencing information that the latter include. Two materially different authenticatable copies such as two different material documents or two different electronic documents or a material document and an electronic document are considered to be two material specimens of one and the same authenticatable copy if these two documents possess identical rules. This uniqueness can in certain cases be judged by coupling the rules with the intrinsic reference of the reference original document. The number of material specimens of one and the same authenticatable copy is not limited. The possible multiplicity of material specimens of one and the same authenticatable copy does not influence the possibilities and restrictions of reproduction within a framework of an authentication of this authenticatable copy. According to a particular embodiment of the invention, the coexistence of two or more material copies may be prohibited or controlled either in an overall manner, or by the issuing entity, or by the owning entity or by any other entity or combinations of entities involved directly or indirectly in the overall authentication process linked with this authenticatable copy. The detection of the existence of a number of material copies of one and the same authenticatable copy not complying with what is defined or imposed can give rise to any security action defined in advance or upon detection of this unauthorized multiplicity. The detection of the multiplicity of material copies of one and the same authenticatable copy may be fortuitous or result from human and/or computer cross-checks whose definition is the responsibility of the entities involved in the overall authentication process. By way of example, the use of one and the same authenticatable copy at two distinct geographical places optionally materialized by computerized parameters such as IP numbers or GPS positions in a time interval not allowing the use of a single material copy allows such detection in the case where it is not authorized to have more than a single material copy of one and the same authenticatable copy.

Outside of the marks and rules, the real content of an authenticatable copy may diverge from that of the original document to which it is attached. This content may contain all or some of the content of the associated original document and may contain as a supplement a content disjoint from that of the associated original document.

Numerous organizations no longer desire to transmit copies of the documents produced to external entities but simply to advise them of the availability of the document produced via a predefined access. For example a mobile telephone provider, rather than transmitting the monthly bill to its customer, will make it available on an Internet site accessible to the latter, optionally via an identified access. The customer may or may not be advised of this making available by an email or a telephonic message (SMS). If the issuing of this bill is periodic, it will for example be possible for the provider not to warn the customer considering that the latter is aware of this periodicity. This access offered to the recipient, whether or not it is accompanied by an advice, plays the role of copy, since by virtue of the latter, the recipient can access his document (bill or other) when he so wishes, just as he would do with a copy transmitted by traditional mail, the latter is dubbed access to the original subsequently.

To group together in one and the same category the accesses to the original and the authenticatable ownership copies which both chiefly allow an owning entity to obtain new authenticatable copies, preferably but not exclusively authenticatable transmission copies are dubbed key for owner access to the original subsequently.

The entity which possesses an authenticatable copy is dubbed an owning entity. This definition is also applicable when the entity does not possess any authenticatable copy but has a means for procuring same. The invention describes such process of obtaining an authenticatable copy.

Any entity which requests from an owning entity an authenticated copy or an authenticatable copy of an original document of which the latter possesses an authenticatable copy or apt to possess same is dubbed a requesting entity.

When dependency ties are created on the basis of certain original documents on a particular original document, the latter is dubbed reference original document. There may or may not be reciprocity in the notion of reference original document: depending on the reproduction process in progress, an original document may be attached to a reference original document, this notion may then be inverted in another reproduction process. This may be in particular the case when several versions of one and the same document exist, as is defined hereinafter.

For a reference original document, any other original document which is considered by its issuing entity to be a different version of this reference original document whether this version is created before, after or simultaneously with this reference original document is dubbed other original version. According to a particular embodiment of the invention, the notion of other original version of a reference original document can be established by any entity other than the issuing entity and/or in a manner desynchronized with the creation of the various other original versions associated with the reference original document. This signifies in particular that an entity distinct from the entity issuing the reference original document can create another original version associated with this reference original document. This also signifies that the creation of an original document and its qualification as other original version associated with a reference original document are two operations that may be independent in particular at the level of the chronology of the definition and of the creation. An original document can be defined as other original version by an entity which is not its issuing entity, this may in particular be applicable to the authentication management entity.

For an original document, any other original document which is considered by its issuing entity to be a variant of this original document is dubbed other original variant subsequently. It is possible to cite in a nonlimiting manner as other original variant of an original unitary document one and the same version of this document in another language or the same document but addressed to different populations and therefore with compositions tailored as a function of these various populations. This is also the case, for a document of financial type such as a bill, in respect of its presentation in various formats so as to render it compatible with the information system of the requesting unit, this is particularly true for electronic documents. An original unitary document can be defined as other original variant by an entity which is not its issuing entity, this may in particular be applicable to the authentication management entity.

For an original unitary document, any other original document which is considered by its issuing entity to be a document connected therewith is dubbed connected original document subsequently. This may for example be a credit or a refund receipt, if the associated original document is a bill. This may be an advice regarding termination or modification of a contract of work if the initial document is a pay slip, etc. An original unitary document can be defined as connected original document by an entity which is not its issuing entity, this may in particular be applicable to the authentication management entity. According to a particular mode of the invention, a connected original document may be limited to an item of data or to a set of structured or unstructured data, such as a new address, an indication of variation of amounts in monthly billing, a termination of contract, etc.

Any hardware device making it possible on the basis of an authenticatable copy in the form of a material document to obtain a new authenticatable document and/or a new authenticated document is dubbed tailored reproduction system subsequently. The document obtained may be a material document and/or an electronic document, likewise a plurality of these documents may be obtained. A simple scanner or digitizer, driven by a computerized intelligence, is also considered to be a reproduction system since the result of the digitization makes it possible to obtain a copy in the form of a material document by association therewith a tailored printer or in the form of an electronic document by using tailored software and computing tools. A scanner thus defined driven by a computerized intelligence allowing it on the basis of an authenticatable document to obtain a new authenticatable document and/or a new authenticated document is also considered to be a tailored reproduction system. The obtaining of the authenticated copies and/or of the authenticatable copies on the basis of a tailored reproduction system are described in the present invention.

An authenticatable copy in the form of an electronic document can be submitted to a reproduction process via a specific computing tool capable of detecting the authenticatable and therefore sensitive character of the electronic document which is submitted to it by identification of the marks which are incorporated therein and of ascertaining what are the possibilities and restrictions of reproduction associated with this document by searching for and decrypting the rules which are inserted therein. Such software makes it possible to obtain one or more authenticatable copies and/or one or more copies authenticatable on the basis of the authenticatable copy in the form of an electronic document or in the form of material documents. Such software is dubbed tailored reproduction software subsequently. Any authenticatable copy or authenticated copy obtained by tailored reproduction software on the basis of an authenticatable copy is a new copy which has rules which are inherent to it when it entails an authenticatable copy and therefore different from that of the authenticatable copy which made it possible to generate it. In the case where several authenticatable material copies of one and the same copy are authorized, these copies can be obtained either by tailored reproduction software as well as by any standard reproduction software (that is to say not specifically tailored to suit the invention) or any standard printing software on condition that such software preserves in the copying or printing process the existence of the marks and rules in the copy produced. In the case where several authenticatable material copies of one and the same copy are not authorized, but that reproduction software or standard printing software or software specifically tailored by a third-party allows such a multiplicity of material copies of one and the same authenticatable copy, the prohibition will be managed through the use of these various material copies.

Intelligent mobile telephones (Smartphones), tablets (touch-sensitive or with keyboard) and PDAs (Personal Digital Assistants) have ever higher computational powers making it possible to incorporate applications customarily hosted on more powerful computing devices such as PCs (Personal Computers). In addition to this computerized intelligence, these apparatuses have a photographic objective allowing photos and/or videos to be taken at ever higher resolutions (8 Megapixels and more for the photographic part). It is likely that new models or indeed new types of apparatuses will also group together computerized intelligence and photographic/video capacity. The photos or videos taken by all these apparatuses, present and future, of secure documents can be submitted to processing operations of computerized type by using either the onboard computational power embedded in these devices or a connected intelligence (SaaS, Software as a Service, operation). Employing technologies mastered by the person skilled in the art the image (photograph) or the series of images (video) provided by these devices can be processed so as to have a partial view of the document forming the subject of the snapshot of comparable quality to that obtained by a digitizer (scanner) and therefore with the capacity to detect the marks thereof and to extract the rules therefrom and consequently to identify the authenticatable character of a document and to undertake a request for authenticatable copy and/or a request for authenticated copy in compliance with the framework of the invention. These apparatuses mostly possessing means of network connection (in a non-exhaustive manner Internet connection of Wifi, Edge, 3G type, etc.) can take on these requests as would be possible on the basis of a tailored reproduction system. These apparatuses will be dubbed tailored mobility interface subsequently when they have the capacity on the basis of a paper document which is itself an authenticatable copy to obtain within the framework of the invention one or more authenticatable copies and/or one or more authenticated copies. This possibility is also offered when the technical framework so permits on the basis of the image of an authenticatable copy on a screen which according to the definitions of our patent is in this case also a material document. This type of equipment also has the possibility of utilizing electronic documents, when these documents are authenticatable documents and when this equipment has the possibility on the basis of such documents of producing one or more authenticated copies and/or authenticatable copies, the equipment is then considered to be tailored reproduction software within the framework of the invention.

To obtain an authenticatable copy and/or an authenticated copy, an owning entity can solicit a specialized service such as an Internet site which will authorize it in accordance with certain authentication conditions (login/password for example, IP address identification, etc.) to access certain structured information which is itself considered to be original unitary documents. On the basis of these original unitary documents and of this specialized service, the owning entity will be able to also request an authenticatable copy and/or an authenticated copy as it could do on the basis of a tailored reproduction system. In this case, this specialized service is dubbed a tailored remote access system.

To group together in one and the same entity the tailored reproduction systems, the mobility interfaces and the tailored remote access systems, we group these three entities together under a common title: authentication delivery systems.

The method claimed is tailored to managing any authentication operation on any type of document, paper document and/or electronic document. The authentication resulting from this method whatever the source, paper document and/or electronic document, is itself produced in the form of a paper document and/or in the form of an electronic document, in the form of a document and/or in the form of information utilizable by an information system.

The method disclosed in the present invention incorporates what was already defined in the prior art with several new functionalities and in particular only authenticatable copies allow the obtaining of authenticated copies. Neither the authenticatable copies nor the authenticated copies are original documents. The novel method involves three parties instead of the two indicated in the earlier patent, namely the issuer and the owner of the authenticatable original. In the method which is the subject of the present invention, the requesting entity is the third party, whereas the owner of the original is replaced with the owning entity that is no longer in possession of an original but solely of a key for access to the original.

Any issuing entity that produces an original document stores it in a safe whose management is ensured by an authentication management entity whether or not the latter is independent of the issuing entity. Simultaneously with this operation or subsequent thereto, the issuing entity issues a key for owner access to the original to the owning unit or to several owning entities, in particular cases this key for owner access to the original may be transmitted and/or created before the creation of the original document in particular when the key for owner access to the original is of the type: access to the original. With each request for authenticated copy of an original document by a requesting entity to the owning unit, the owning unit solicited, via its key for owner access to the original, requests the authentication management entity for an authenticatable transmission copy according to a mode, described hereinafter, specific to the invention, the request is performed by the owning entity at the authentication management entity indirectly by using an authentication delivery system tailored to the nature of the key, in the ownership of this owning entity, for owner access to the original. The authenticatable transmission copy is then produced by the authentication management entity and then transmitted to the owning entity or directly to the requesting entity via the authentication delivery system. In the case where the authenticatable transmission copy is delivered to the owning entity, the latter transmits it to the requesting entity. The requesting entity via its authenticatable transmission copy can then solicit, via a mode, described hereinafter, specific to the invention, the authentication management entity to obtain directly from the latter one or more authenticated copies.

To obtain an authenticatable transmission copy of a designated original document, the owning entity uses its key for owner access to the original associated with the designated original document. In the case where the key for owner access to the original is an authenticatable ownership copy, the latter is then submitted to a tailored reproduction system. The latter identifies its authenticatable copy character by detecting the marks. Once this character has been determined, the rules are searched for so as to determine the authentication characteristics accessible on the basis of this authenticatable copy. The owning entity defines the characteristics of the authenticatable transmission copy or copies that it desires to obtain, these characteristics are defined by the owning entity as a function of the characteristics of the requests of the entities requesting, of its own wishes and of the limits and possibilities linked with the authenticatable ownership copy that it presents to the tailored reproduction system. This request is transmitted and processed by the authentication management entity which constructs rules tailored to the document or documents produced. These rules make it possible to define the capacities of authentication of this document either in an autonomous manner or in coordination with complementary information accessible by the authentication management entity whether or not this information was created by this entity, optionally complementary to other data inserted naturally into the document in a visually accessible form or not. In the case where the key for owner access to the original is an access to the original, the owning entity uses a tailored remote access system which allows it to access the designated original document and to define under the same conditions as previously an authenticatable transmission copy tailored to the request of the requesting entity, of his own wishes and of the limits and possibilities linked with the original document and defined by the authentication management system depending on diverse parameters, including those defining the owning entity. This authentication management system created the rules of the document to be produced as in the case of obtaining on the basis of an authenticatable ownership copy. In both cases, the authenticatable transmission copy or copies are produced with marks so as to be identified as authenticatable documents and the rules constructed by the authentication management system.

To obtain an authenticated copy of a designated original document, the requesting entity uses its authenticatable transmission copy associated with the designated original document. The latter is then submitted to a tailored reproduction system. The latter identifies its authenticatable copy character by detecting the marks. Once this character has been determined, the rules are searched for so as to determine the authentication characteristics accessible on the basis of this authenticatable copy. The requesting entity defines the characteristics of the authenticated copy or copies that it desires to obtain, these characteristics are defined by the requesting entity as a function of the limits and possibilities of the authenticatable transmission copy that are defined by the owning entity and of its own wishes. This request is transmitted by the tailored reproduction system to the authentication management entity which produces the authenticated copy or copies requested within the allowed limits defined directly or indirectly for the authenticatable transmission copy. The authentication management entity via the authentication delivery system transmits the requested authenticated copy or copies to the requesting entity or according to a particular mode of the invention to entities defined by the latter.

In all cases where an authenticatable copy is used to obtain authenticatable copies and/or authenticated copies, the tailored reproduction system may be replaced with a tailored mobility interface with equivalent results.

When the issuing entity created with respect to a reference original document another original version or another original variant or a connected original document stores them in the safe as for a conventional original document. In parallel with this action, independently or not of any chronology, defines the ties which make it possible to attach this new original document of the reference original document. This information is transmitted by the issuing entity to the authentication management entity. According to a particular mode of the invention, these definitions and transmissions can also be performed by an entity other than the entity issuing the reference original document. The authentication management entity then examines the management information in respect of the original unitary documents and of the copies delivered so as to designate entities requesting eligible to receive authenticated copies of these new original documents and delivers these copies via authentication delivery systems. According to a particular embodiment of the invention, these copies may also be produced at the owner unit holding authenticatable copies of the reference original document and/or also at new entities defined by the authentication management entity without them being requesting entities with respect to the reference original document.

Each authenticatable document is a unique, or potentially unique, element independently of the uniqueness of the item of information conveyed. Two different authenticatable copies giving access to the same item of information and under the same conditions are potentially two different documents. In particular the authenticatable copy produced on the basis of another authenticatable copy is potentially a copy distinct from the latter in the sense that in particular the rules of the copy produced differ from those of the initial authenticatable copy.

When the document produced is in the form of a material document or in the form of an electronic document the authenticatable copies produced use marks and rules in graphical form or in electronic form as defined previously. It is possible on the basis of an authenticatable copy in the form of a material document to obtain via digitization an authenticatable copy in the form of an equivalent electronic document on condition that the digitization process incorporates the recognition of the marks and graphical rules and transforms these elements into electronic equivalent elements. It is also possible on the basis of an authenticatable copy in the form of an electronic document to obtain via printing an authenticatable copy in the form of an equivalent material document on condition that the printing process incorporates the transformation of the marks and electronic rules into graphical equivalent elements. In this case the two authenticatable copies are considered to be identical, that is to say as possessing rules allowing them to obtain the same authenticated copies. According to another embodiment of the invention, the two authenticatable copies thus defined whether this be by a process of digitization or of printing are considered to be two distinct authenticatable copies. The possibility of transformation of an authenticatable copy from material document to electronic document or vice versa allows the owning unit when it requests an authenticatable copy of an original unitary document in its possession to be able to transmit it to the requesting unit in any format at its convenience independently of the format of the initially obtained authenticatable copy. The mark elements and rule elements use one or more technologies which are compatible with these two types of media, paper and electronic.

One of the preferred embodiments of the invention for the marks and the rules is to superimpose a binary item of information on the various constituent parts of the document. Technologies already exist for superimposing such information on images (digital watermarking). For the text parts, which are of particular importance within the framework of the documents for which authentication may be requested, the binary item of information may be encoded by way of the characteristics of the text. This encoding may, in a nonlimiting manner, use variations for example of the gray level used, variations of the spacing of the characters, of their size or of their position with respect to the base line. It is the remit of the person skilled in the art to design a technology allowing such encoding. By defining a sufficiently dense encoding, it is possible to be able to encode an entire rule on a single line in the case of a purely textual area or in a single image part. In this case, this rule can be cut up into several sub-parts that can each be decoded separately. These sub-parts are then distributed over the authenticatable copy so as to obtain a high probability that each of the sub-parts of rules thus defined is present in a sufficiently significant extract of the document corresponding to a photo or to a video scan performed by a tailored mobility interface so that the latter can allow the delivery of authenticatable copies and/or authenticated copies on the basis of an authenticatable copy thus defined.

FIGURES

Figure 3A:
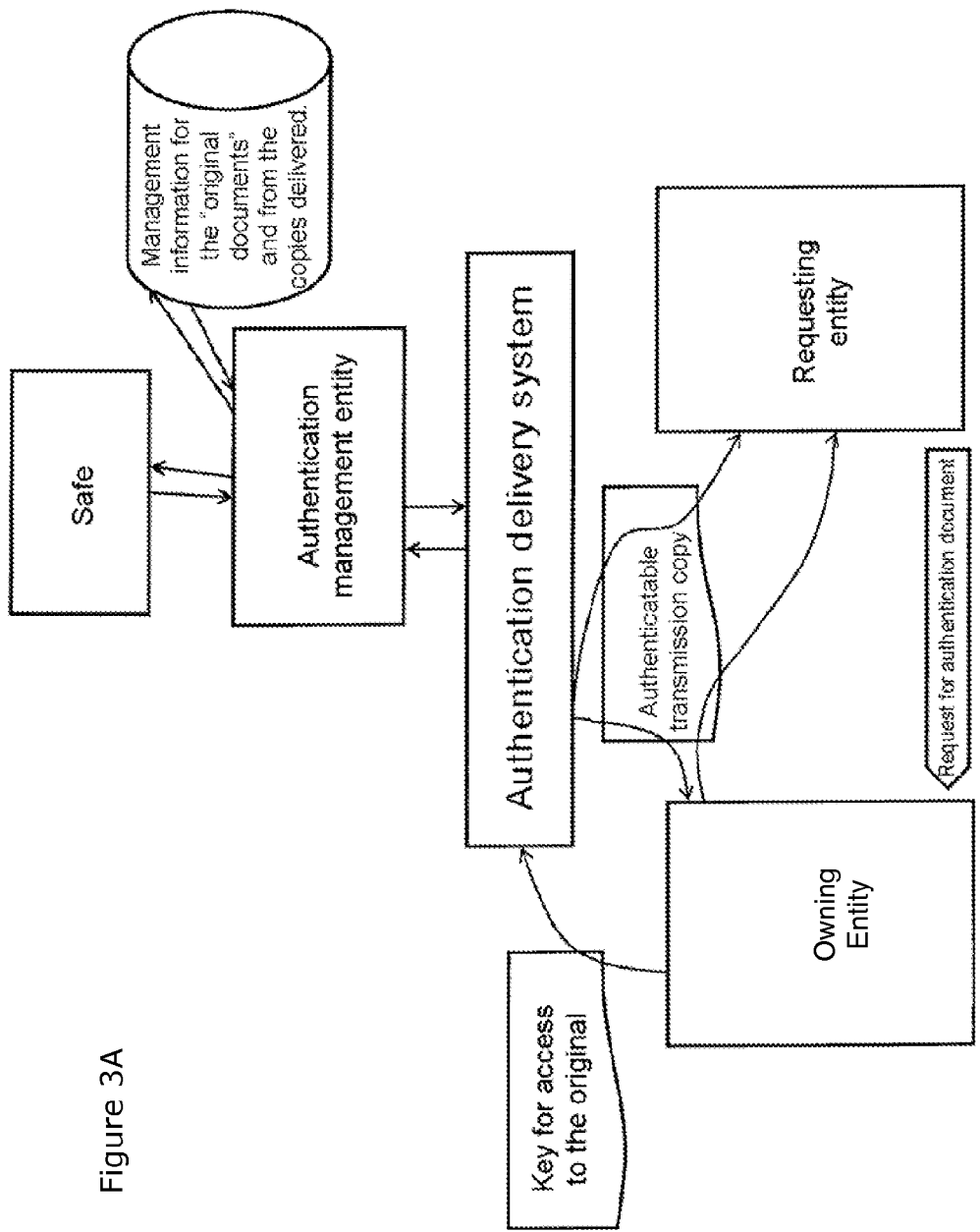
FIG. 3A illustrates the general process of creating an authenticatable transmission copy on the basis of a key for access to the original. This figure is included within the overall FIG. 1.
Figure 3B:
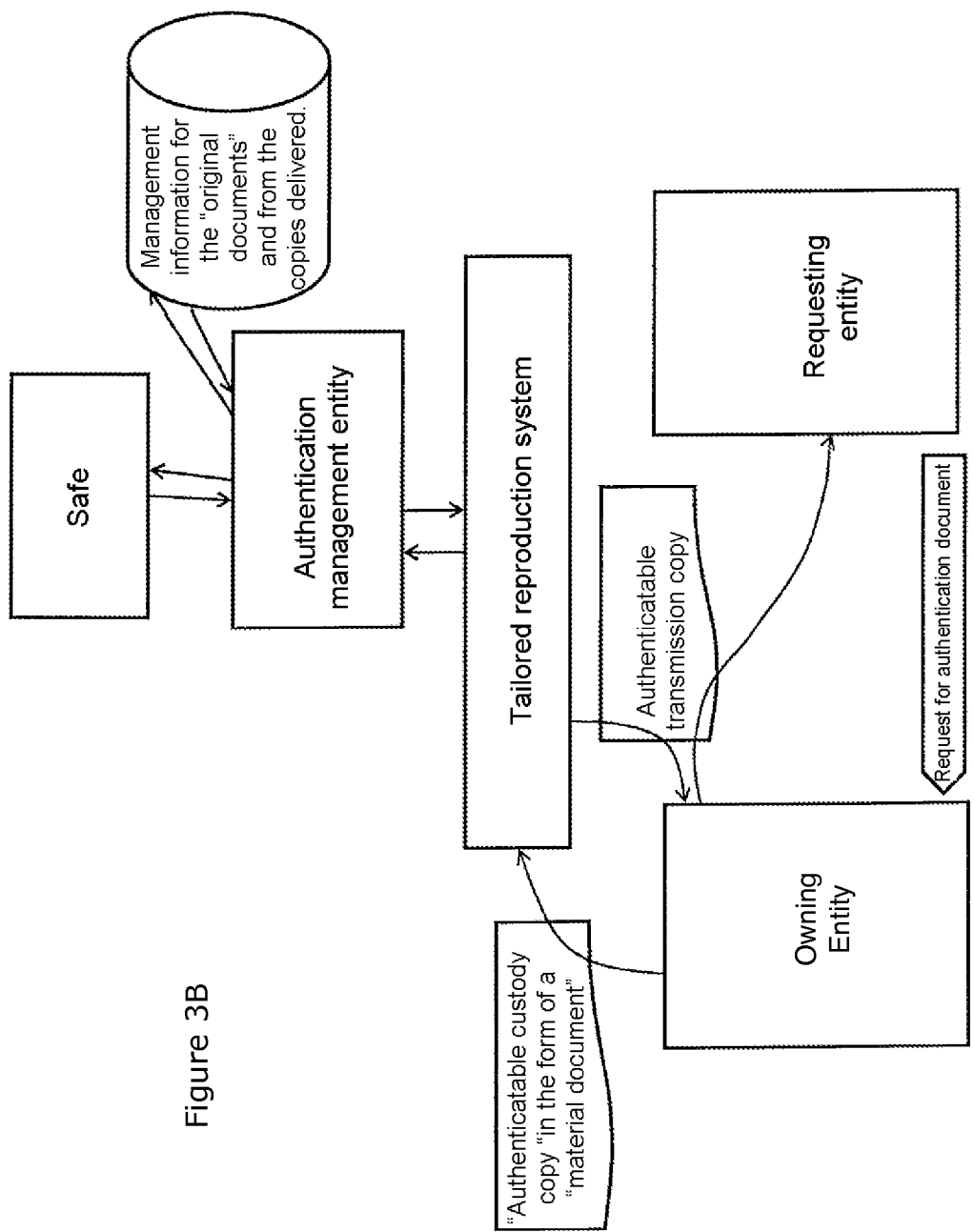

FIG. 3B illustrates the process of creating an authenticatable transmission copy on the basis of an authenticatable ownership copy in the form of a material document. For this figure, the authenticatable transmission copy is produced destined for the owning entity which is in charge of its transmission to the requesting entity. This figure is an adaptation of FIG. 3A to this particular configuration. This figure is applicable also on replacing the tailored reproduction system with a tailored mobility interface.

Figure 3C:
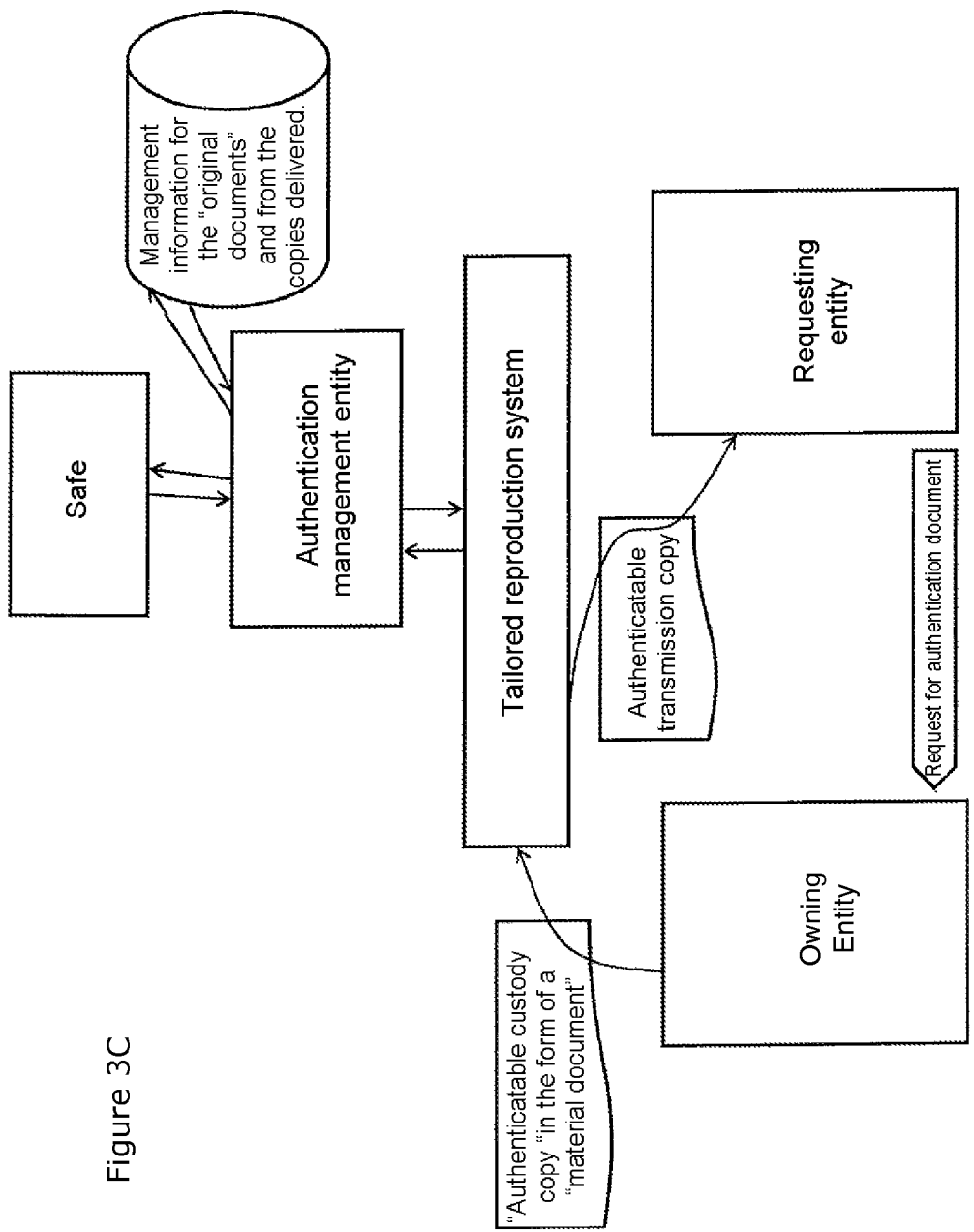

FIG. 3C illustrates the process of creating an authenticatable transmission copy on the basis of an authenticatable ownership copy in the form of a material document. For this figure, the authenticatable transmission copy is directly produced destined for the requesting entity. This figure is an adaptation of FIG. 3A to this particular configuration. This figure is applicable also on replacing the tailored reproduction system with a tailored mobility interface.

Figure 3D:
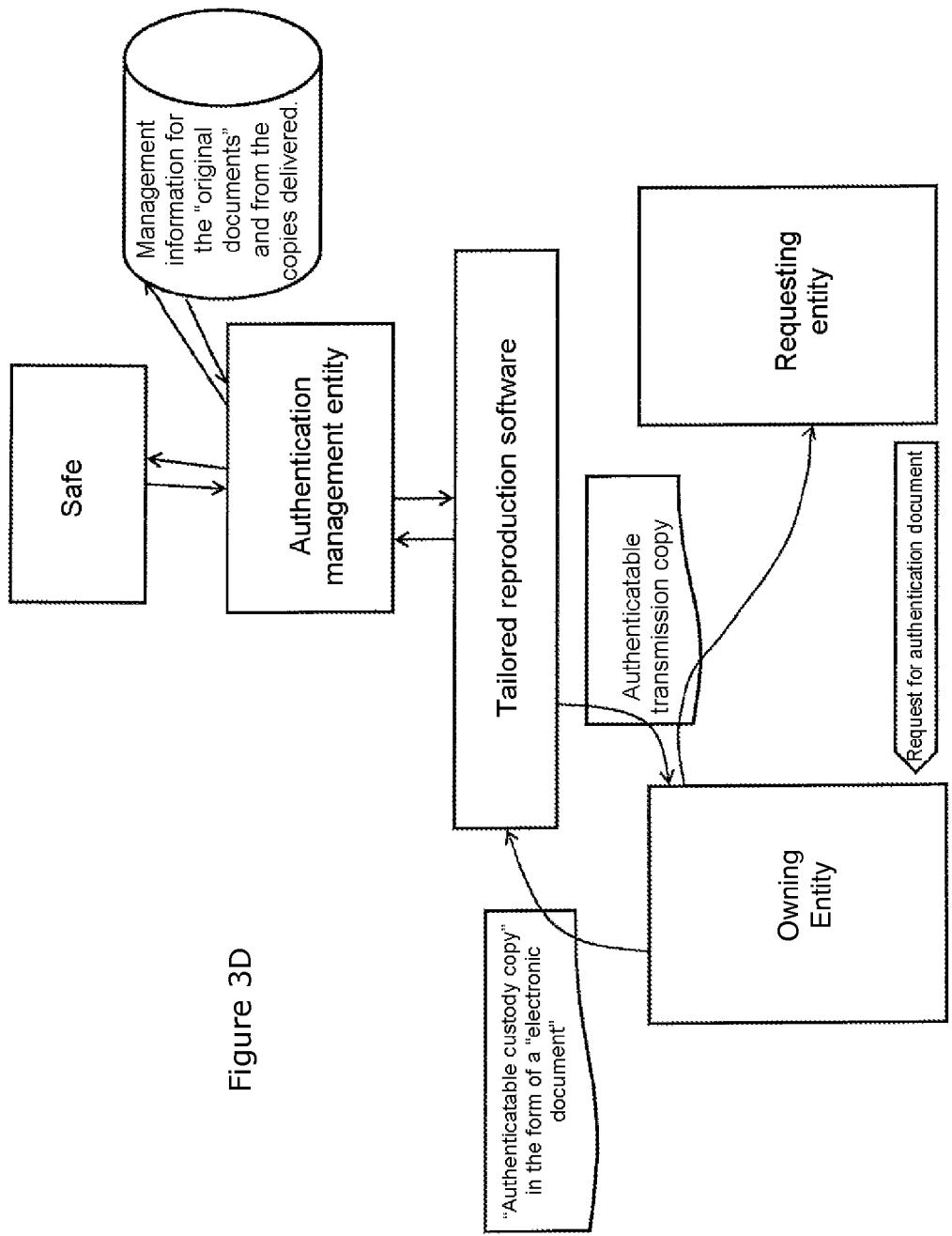

FIG. 3D illustrates the process of creating an authenticatable transmission copy on the basis of an authenticatable ownership copy in the form of an electronic document. For this figure, the authenticatable transmission copy is produced destined for the owning entity which is in charge of its transmission to the requesting entity. This figure is an adaptation of FIG. 3A to this particular configuration.

Figure 3E:
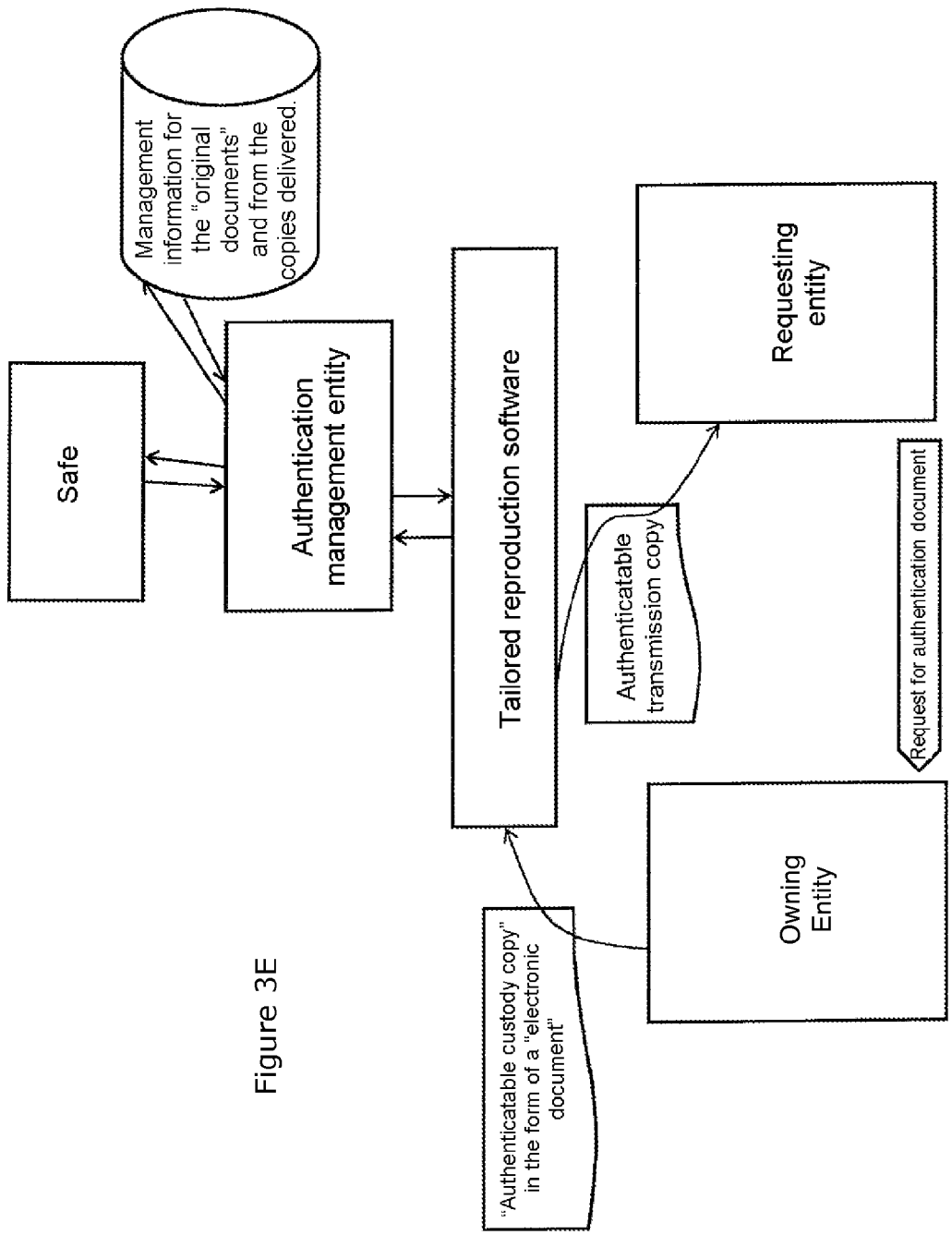
Figure 3F:
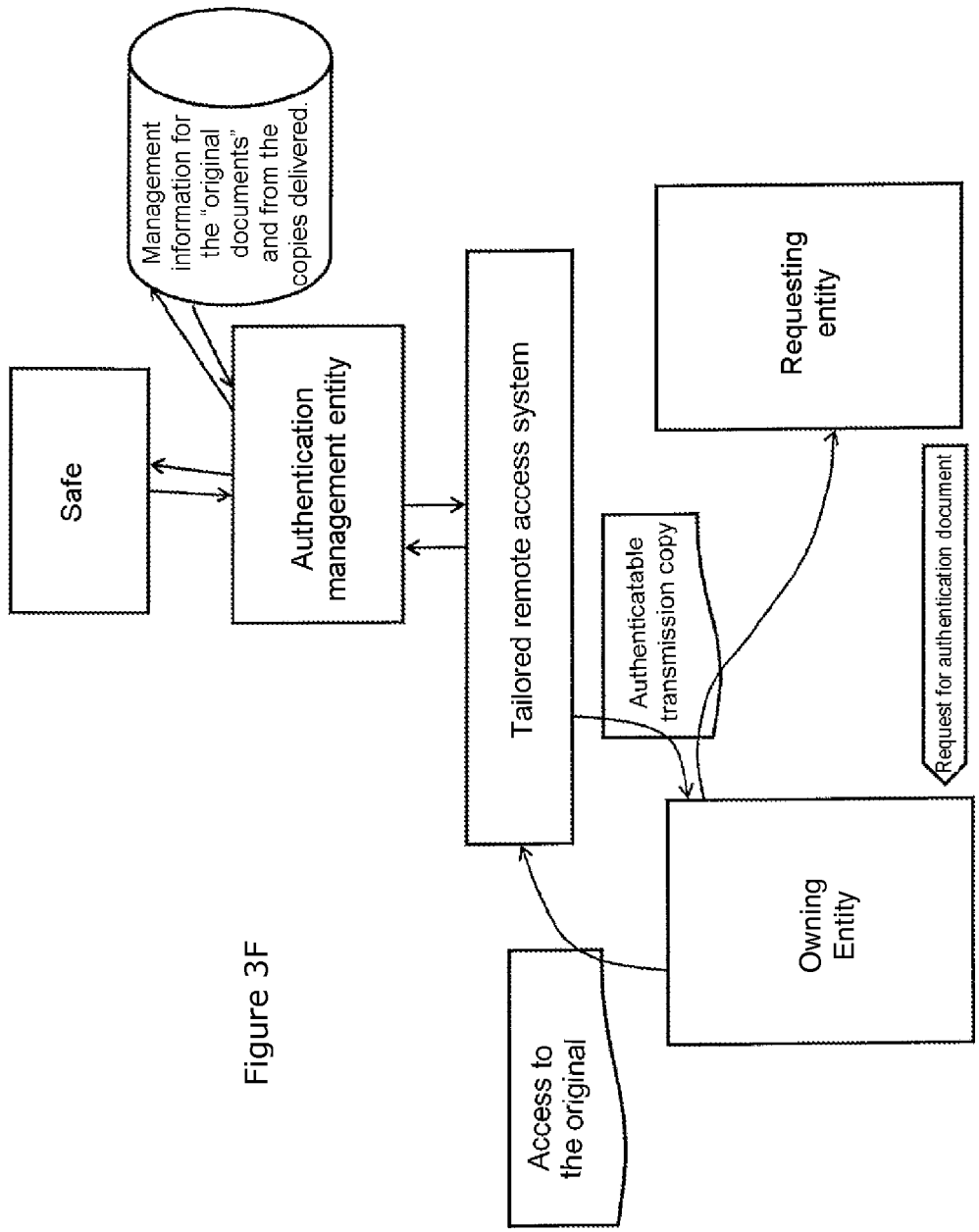

FIG. 3E illustrates the process of creating an authenticatable transmission copy on the basis of an authenticatable ownership copy in the form of an electronic document. For this figure, the authenticatable transmission copy is directly produced destined for the requesting entity. This figure is an adaptation of FIG. 3A to this particular configuration FIG. 3F illustrates the process of creating an authenticatable transmission copy on the basis of an access to the original. For this figure, the authenticatable transmission copy is produced destined for the owning entity which is in charge of its transmission to the requesting entity. This figure is an adaptation of FIG. 3A to this particular configuration.

Figure 3G:
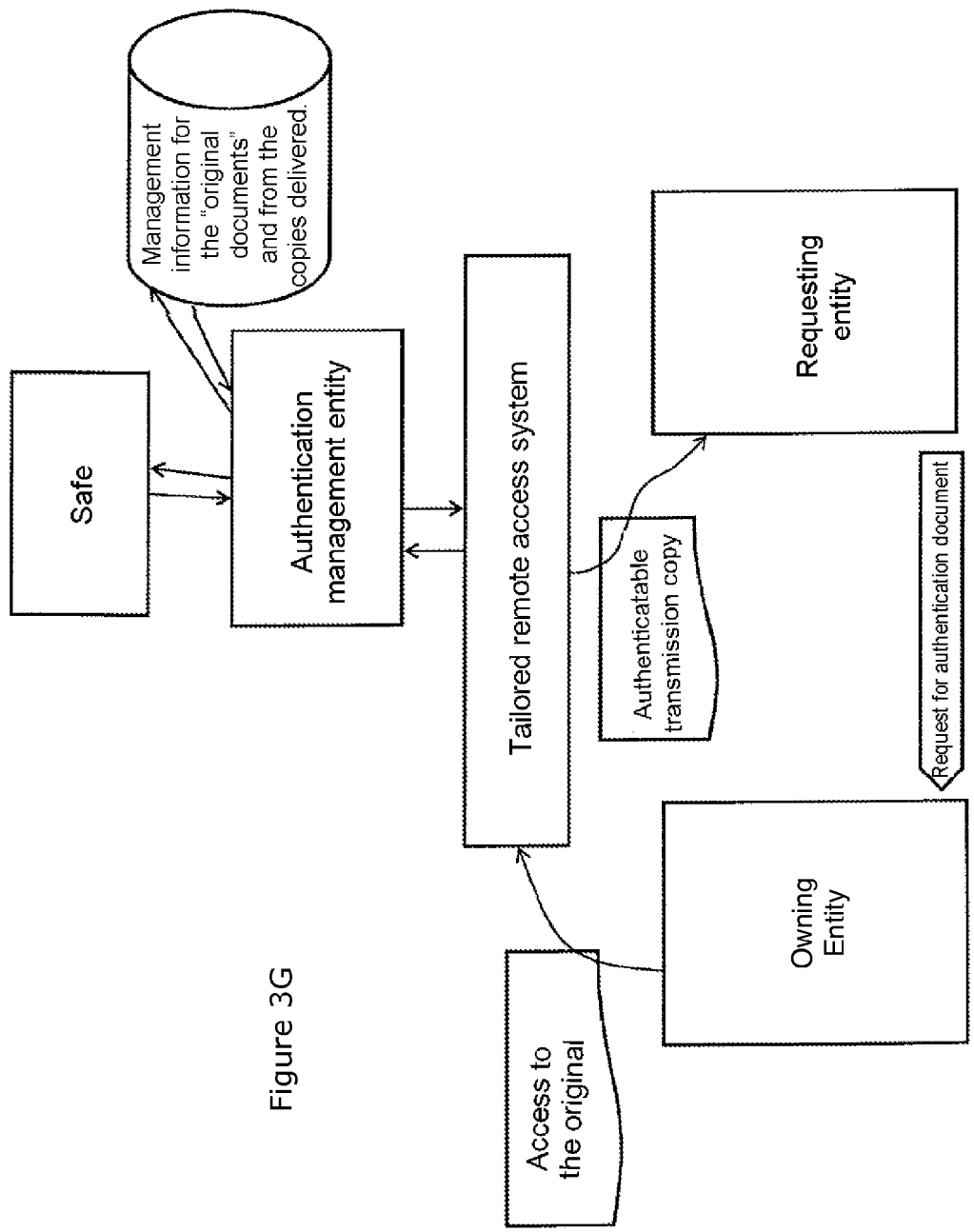

FIG. 3G illustrates the process of creating an authenticatable transmission copy on the basis of an access to the original. For this figure, the authenticatable transmission copy is directly produced destined for the requesting entity. This figure is an adaptation of FIG. 3A to this particular configuration FIG. 4 again depicts the creation part of an authenticated document, this figure is extracted from the overall FIG. 1, FIG. 5 again depicts the updated part of an authenticated document, FIG. 6 is an exemplary spatial disposition of sub-sequences of rules in a paragraph of an authenticatable copy.

Figure 7:
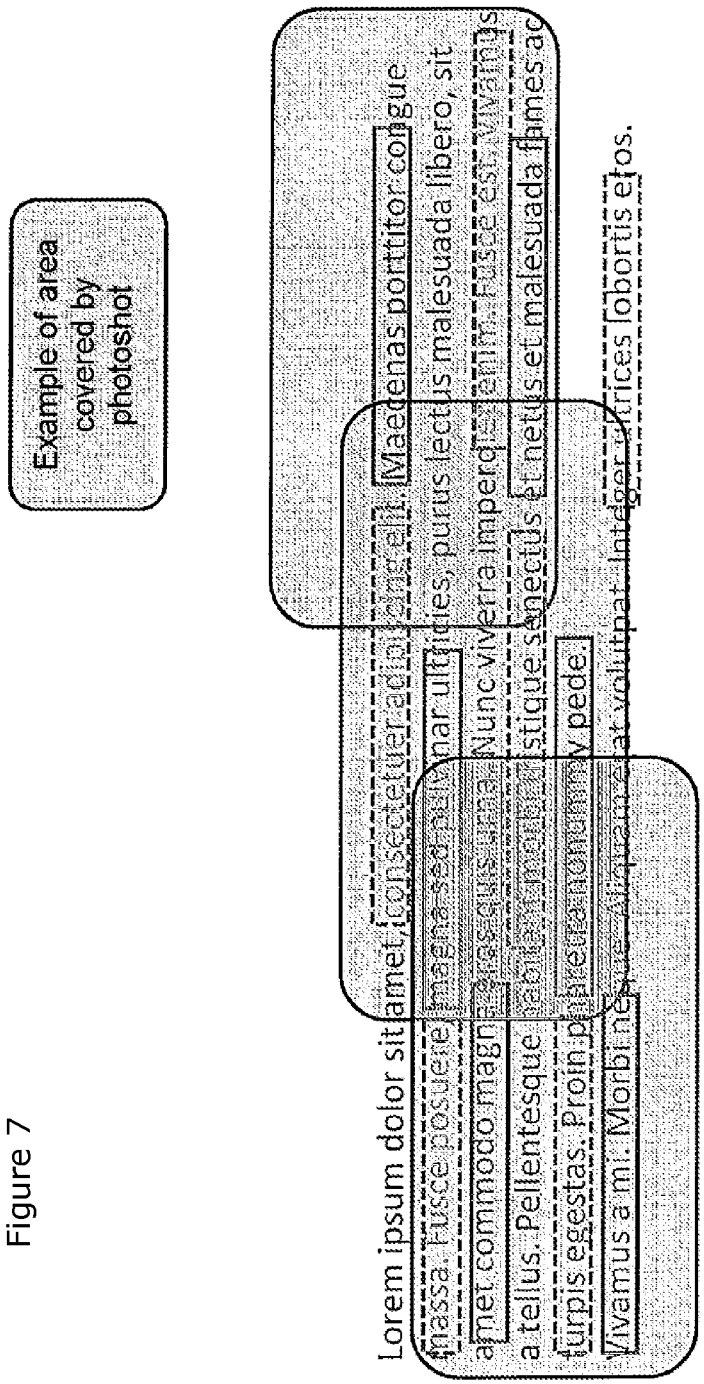

FIG. 7 illustrates the compatibility of an encoding of rules as sub-sequences within the framework of a photographic capture.

Figure 8:
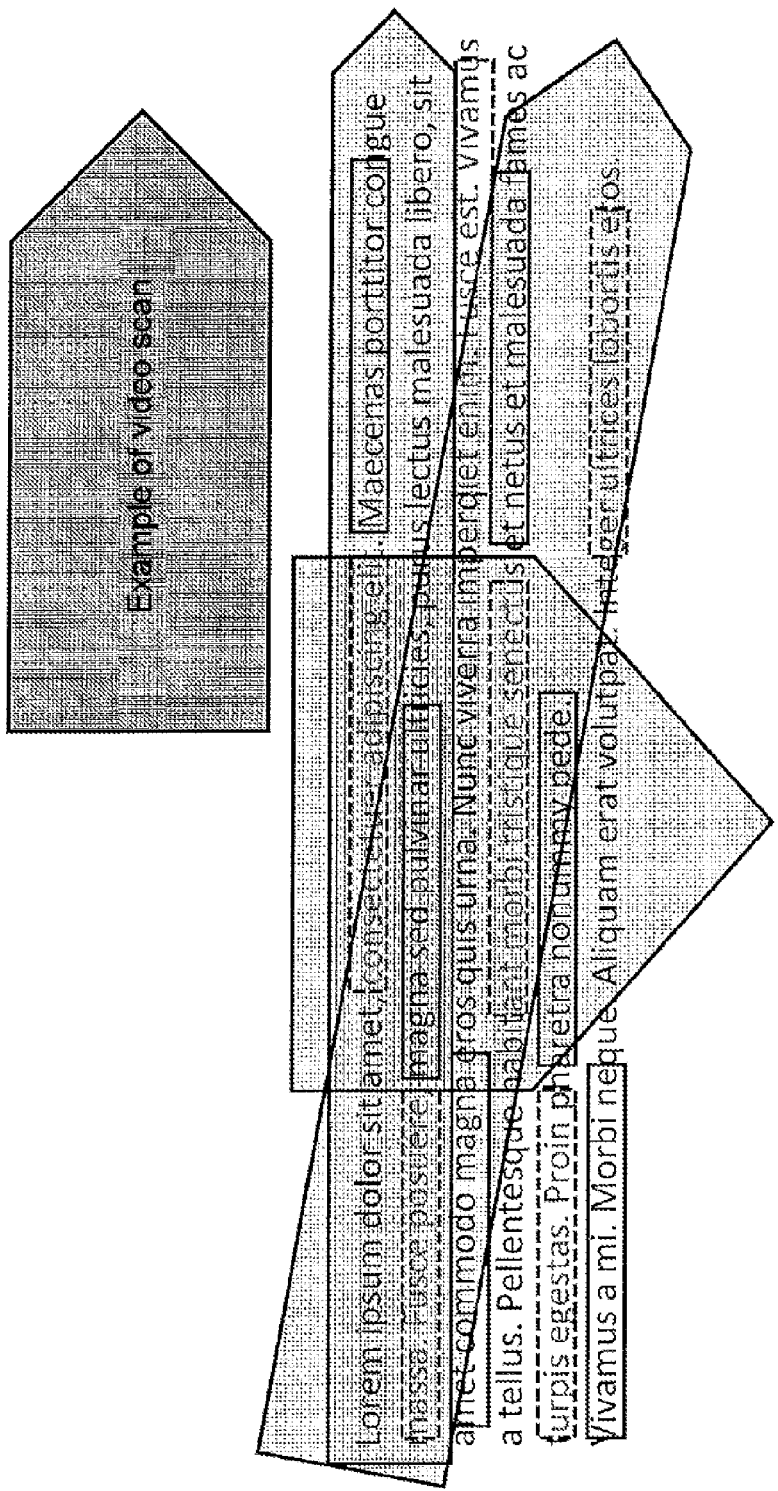

FIG. 8 illustrates the compatibility of an encoding of rules as sub-sequences within the framework of a capture by video scanning.

Figure 1:
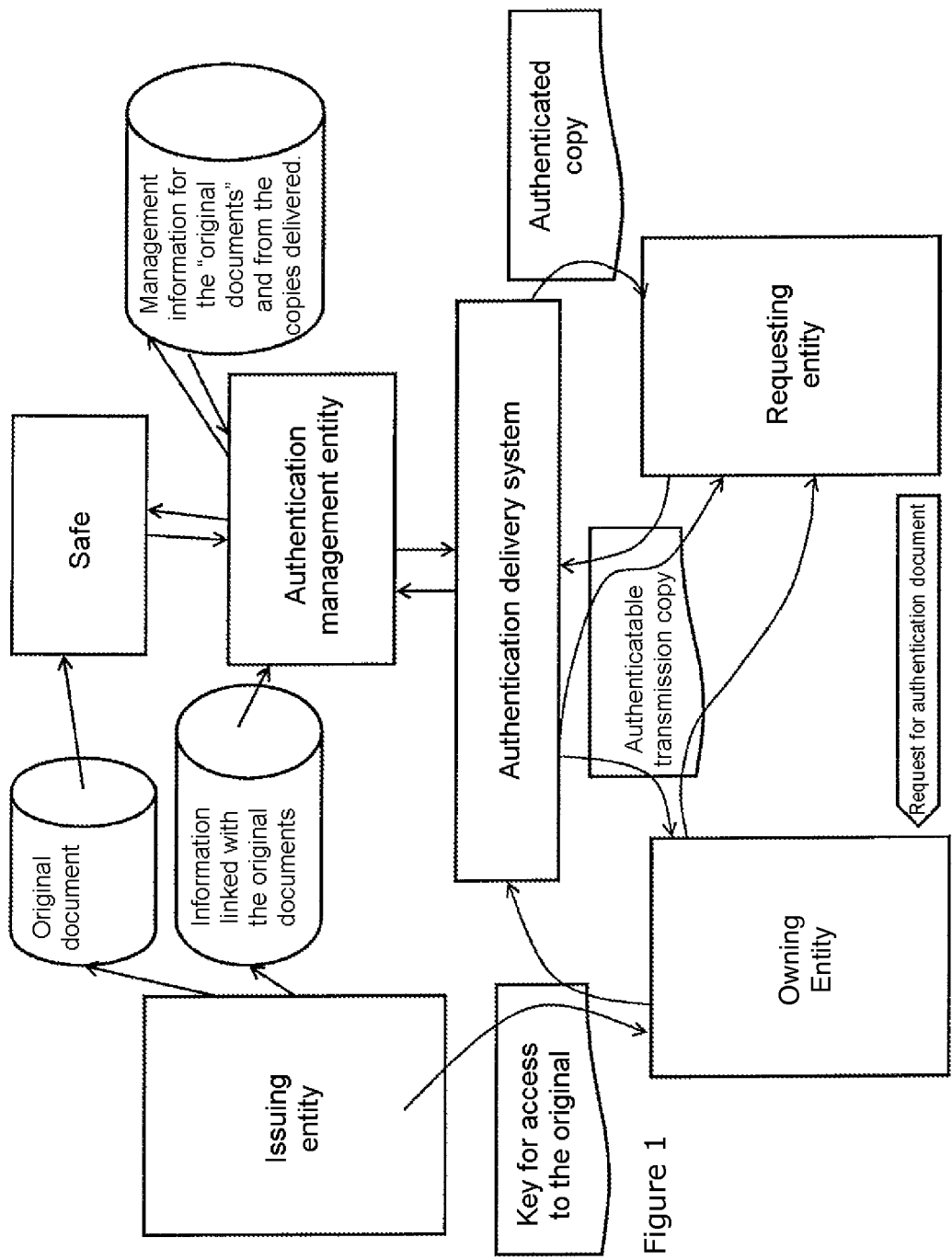
FIG. 1 illustrates the complete method for obtaining authenticated copies.
Figure 2:
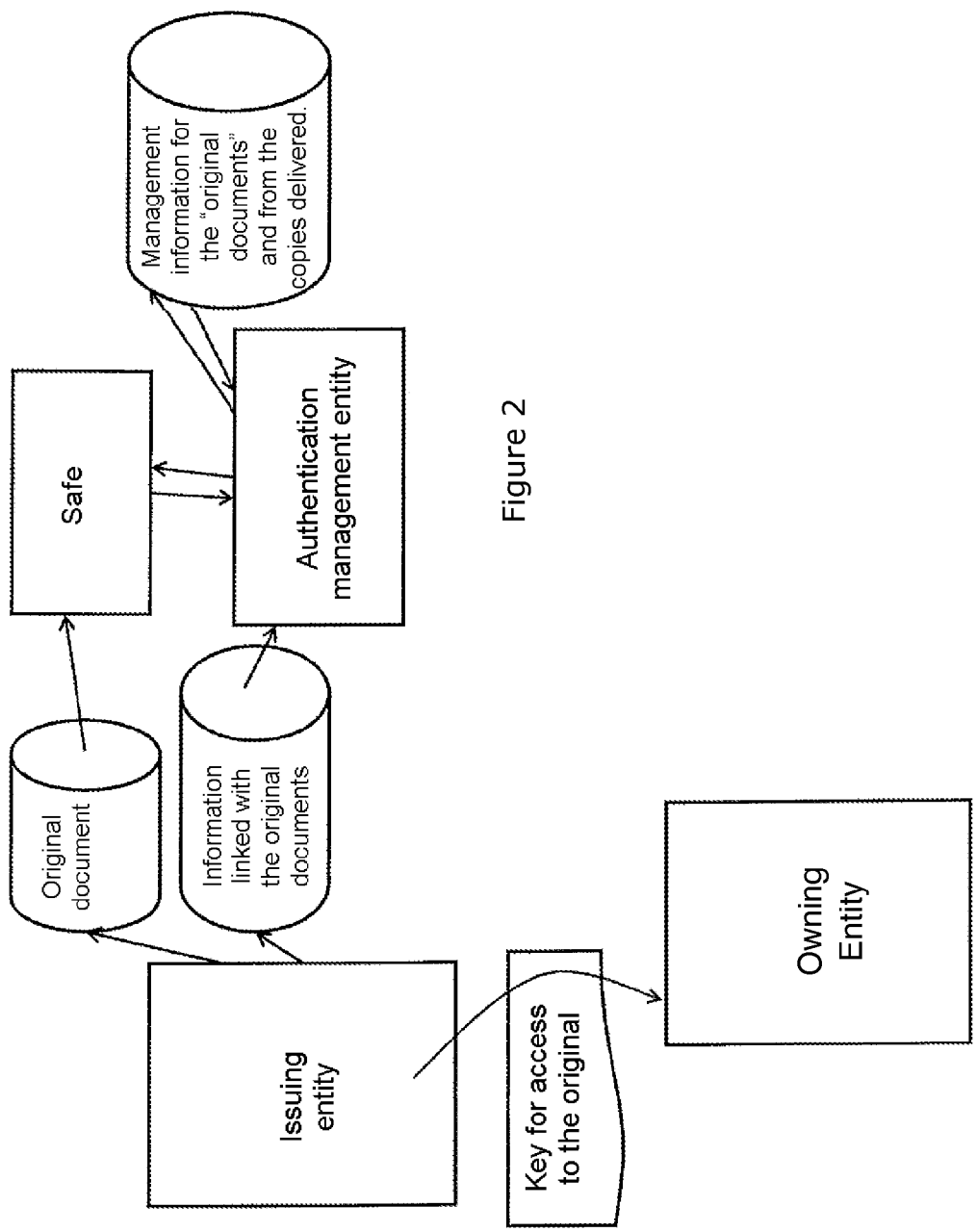
FIG. 2 illustrates the creation part of an original document and of the corresponding creation of the key for access to the original, this figure is extracted from the overall FIG. 1.
Figure 4:
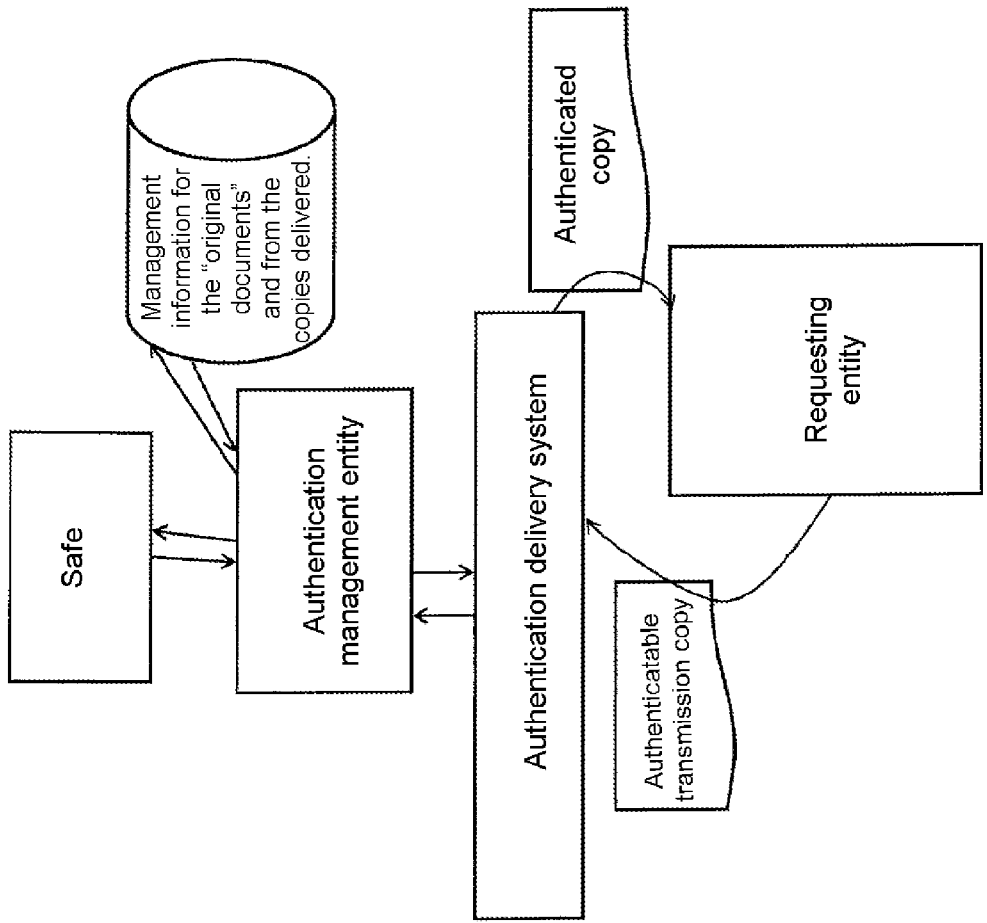

FIG. 1 is an overall figure and will therefore be explained only through the partial views of the latter represented by FIGS. 2, 3 and 4.

In all these figures, the information for managing the original documents and the copies delivered are all the data that the authentication management entity retains in memory and stores relating to any original document, any authenticatable copy and any authenticated copy that this entity manages and/or delivers. This information can include in a nonlimiting manner:

The inventory of the original documents that are accessible to this entity as well as the inventory of the authenticatable copies and authenticated copies associated with these original documents, optionally independently of the entity which delivered them, Any item of information relating to the accessible original documents and which is defined by the issuing entity as well as any complementary item of information delivered by another entity, Any item of information relating to the authenticatable copies originating either from the issuing entity or from the owning entity or from any other entity, Any item of information relating to the authenticated copies, including those defined by other entities, Any item of information relating to the identification of the issuing entities, of the owning entities and of the requesting entities, this information in particular makes it possible to ascertain the possessors of the various authenticatable copies and authenticated copies produced and includes information about physical and/or electronic location allowing the dispatching of material documents and/or electronic documents to these entities.

FIG. 2 illustrates the process of creating an original document. This process complies with what was already described in my earlier patents with a novel notion: the original documents are never submitted directly to a reproduction process, authenticatable copies alone allow authenticated copies to be obtained. Neither the authenticatable copies nor the authenticated copies are original documents. There is also defined a key for access to the original which makes it possible to obtain authenticated copies which incorporates the authenticatable copies but also other objects allowing the solution to be compatible with all the modes of information dissemination, whether material or virtual.

When an issuing entity creates an original unitary document, said entity stores in a safe either an electronic document considered to be the original document produced, or an information set that is sufficient for a computerized production chain to be capable of producing on the basis thereof an image of the original document in the form of a material document and/or electronic document in a presentation format in accordance with the definitions and or directives of the issuing entity. The issuing entity is in charge of defining either for each original document produced or for a set of original documents the safe where the designated original document or documents are stored. The issuing entity is in charge of defining, either for each original document produced, or for a set of original documents, the authentication management entity which will be charged with managing the authentication deliveries linked with each original document produced or with a set of original documents. The definition by the issuing entity either of the safe or of the authentication management entity may be sufficient to designate the two elements. In a particular embodiment of the invention, the issuing entity dispatches its original document to an authentication management entity which takes charge of the definition of the safe and/or the storage of the original document in the safe.

In a particular embodiment of the invention, in the case where the original document consists wholly or partly of a set of information, these data will be able to incorporate complementary contextual data either defined by the issuing entity but in a manner desynchronized with the creation of the original document or defined by any between entity that the issuing entity whether or not these complementary data are defined in a manner synchronous with the production of the original document such as defined previously. All or part of these complementary data will be able to be stored in a safe which is identical or different from the safe used within the previously described normal framework of the invention, this safe optionally being managed by the authentication management entity charged with the management of the original document produced. In this particular mode, it is incumbent on the authentication management entity to guarantee the appropriateness of these data in relation to the guarantee of authenticity of the resulting original document thus defined.

In parallel with the creation of the original document, the issuing entity defines a set of information linked with the original document as well as the information linked with the rights, constraints and restrictions of dissemination of the original document, this including in a non-exhaustive manner:

Contextual information linked with the original document itself, such as its date of creation, its author (entity(entities) and/or individual(individuals)), the original format of creation (PDF, XML, Word, text file, database records, etc), the limits of validity (date of start of validity, end of validity), size, number of pages, The official recipient of the original document, for example the entity or the individual billed for a bill identified by particulars (name, address, etc.) and/or by references (customer number, SS number, etc.), The contractual framework to which the original document is attached. For example the information linked with the utility subscription contracts in respect of periodic billing. This information can either be original documents themselves or data of computing type or any item of information making it possible to ascertain this information: a contract number makes it possible, for example, by accessing an external database, to ascertain the information in respect of this contract.

The referencing of other original documents linked with this original document accessible in the same safe as the reference original document or in one or more other safes.

Constraints of dissemination of the original document and or of the original documents which are associated therewith. These constraints can be defined in a nonlimiting manner for each of the original documents thus defined, in a collective or individual manner, as follows in a combined manner or not:

Time constraints on access to the original document (solely at dates or at defined intervals of dates for example or access modulated as a function of the date of the request), Geographical constraints on access to the original document, access modulated as a function of the location of the request.

Constraints on access to the original document in terms of recipients. Access may be reserved either for one or more identified individuals or for one or more identified entities or for one of more individuals and entities identified by belonging to a category or by combining these definitions. The categories thus defined can correspond to types of entities (administration in a generic manner, particular administration, banks, insurers, etc.) or of individuals (bailiffs, attorneys, medical personnel in a generic manner or defined categories of medical personnel, etc.) independently of their inherent identity.

Constraint in terms of volume, the number of copies produced (authenticatable copies and or authenticated copies) can be bracketed by limits in terms of number in an overall manner or in combination with the other characteristics (for example: limits based on the function of the recipient or the delivery dates).

Constraint in terms of delivery format of the copies. The delivery format of the authenticatable copies and authenticated copies produced may be limited. The copies might be produced only in the form of a material document or only in the form of an electronic document, and in these two cases just in certain formats (PDF for example) or media (A4 paper for example). These constraints may also concern the content itself: deletion or redefinition of the colors of the copy, deletion of certain constituents of the document (logo, signature, amount, paragraphs, etc.), magnification or reduction of the document, modification or imposition of the double-sided characteristics of the document.

Constraint in terms of traceability: any operation of delivery of a copy may form the subject of an archiving (memory storage of the characteristics of delivery). An image of the copy delivered can also be stored in accordance with particular modalities.

Constraint in terms of notification: each delivery may form the subject of a notification to the issuing entity and/or to the owning entity and/or to any other entity in accordance with particular modalities.

According to a particular mode of the invention, the information linked with the rights, constraints and restrictions of dissemination of the original document may be defined in a manner desynchronized with the creation of the original document or in a generic manner for a type of original documents. This definition can be supplemented or modified subsequent to one or more earlier definitions. The successive definitions may be performed by entities different from the issuing entity, they may also be defined globally or partially by distinct entities.

All of this information is received by the authentication management entity which stores it in accordance with modalities inherent to it so as to ensure the management of delivery of authentications, associated with the original document stored in a safe in accordance with these definitions.

FIG. 3 illustrates the process of creating an authenticatable transmission copy. This authenticatable transmission copy is requested by the owning entity with the aim of making available to a requesting entity an authenticated document linked with an original document on which the owning entity possesses a key for access to the original. This request is made so as to respond to a corresponding request of the requesting entity, whether the latter is explicit or implicit.

Such a request, implicit or explicit, may thus be necessary by the requesting entity in the following, non-exhaustive cases:

If the requesting entity is a bank and the owning entity is an individual, within the framework of the opening of a bank account or of the obtaining of any type of credit, this request may concern any document serving as proof of address (Identity papers, electricity, gas or telephone provider bills as well as any itemized provision associated with an address), wage slips, work contract, documents contractualizing the subject of the credit (Promise to sell, commercial proposal), administrative or notarized documents linked with the good to be acquired, If the requesting entity is a bank and the owning entity is an enterprise, within the framework of the opening of a bank account or of the obtaining of any type of credit, this request may concern any document detailing the enterprise (administrative, legal or accounting documents) as well as any document detailing the transaction (order, bills, contracts, etc.)

Within a general framework, whatever the requesting entity and the owning entity, the request may concern and in a nonlimiting manner any administrative or private document whether this document attests to a particular status of the requesting entity, the latter's attachment to a good, to an individual or to a collectivity of individuals, to a commercial and/or administrative entity or entities, a contractual, transactional or business relationship.

The owning entity then uses the key for access to the original in its possession attached to the original document which is the subject of the request, implicit or explicit, of the requesting entity to formulate a request for authenticatable transmission copy via an authentication delivery system.

Simple ownership of the key for access to the original may suffice for its owner to authorize same to solicit the authentication management entity associated with the authenticatable copy processed via the tailored authentication delivery system tailored interface. This possibility may however is subordinated to a complementary identification, thus any complementary item of information directly or indirectly detailing the requester, that is to say the entity making the request, could be asked for. Information directly detailing the requester may be in a non-exhaustive manner: his name, his address, his date of birth, certain preferences, etc. Information detailing the requester indirectly may be in a non-exhaustive manner: a login/password, a special code, the answer to a secret question. This access may also be subordinated to the use of a specially identified connection i.e. in a non-exhaustive manner: access from a pay-to-access Internet site, the use of a particular network identifier (IP number for example). Access may also be subordinated to any combination of these modes.

The owning unit when it requests an authenticatable transmission copy via an authentication delivery system defines the possibilities and limits of use of the authenticatable transmission copy that it desires to obtain. These definitions relate to the potentialities for obtaining authenticated copies on the basis of the authenticatable transmission copy produced. These may be defined as follows in a non-exhaustive manner, as cumulative or non-cumulative:

Obtaining of a simple authenticated copy: i.e. the possibility of obtaining an authenticated copy of the original document, this copy being limited to the information already included in the authenticatable transmission copy produced or of the associated original document. In contradistinction to any authenticatable document issued on action of the owning entity in conjunction with the issuing entity, the authenticated copy is produced by a direct relationship between the original document's authentication management entity and the requesting entity via the authenticatable transmission copy without direct intervention either of the issuing entity or of the owning entity during the delivery of the authenticated copy.

Obtaining of any authenticated copy produced on the basis of another original version of the reference original document associated with the authenticatable transmission copy to be produced as well as any authenticated document produced on the basis of any other original variant and any connected original document associated with this same reference original document. The list of the authenticated documents being able thus to obtain on the basis of the authenticatable transmission copy to be produced may be defined either directly by the owning entity by an appropriate selection proposed by the authentication management entity through the authentication delivery system with which the owning entity is interfaced or indirectly. When the list is produced indirectly, it is defined by the owning entity by an appropriate selection of criteria proposed by the authentication management entity through the authentication delivery system with which the owning entity is interfaced. This directly or indirectly defined list can include original documents associated with the original document independently of their chronology, the original documents proposed in addition to the reference original document being able to have an identical, older or more recent date-stamping than that of the latter document. Likewise this list can implicitly or explicitly include original documents associated with the reference original document that has not yet been created and/or not yet deposited in a safe managed by the authentication management entity solicited by the issuing entity via an authentication delivery system. Thus if the issuing entity authorizes on the creation of an authenticatable transmission copy the obtaining of authenticated copies of a reference original document which may be for example the last monthly bill relating to this entity for a given service such as the provision of electricity as well as to the other original versions associated with this reference original document over a period of six months after the date of creation of this authenticatable document, it implicitly authorizes access to the next six monthly bills which have not yet been created and therefore not yet stored in a safe of this service to this entity.

Obtaining of an authenticated copy a posteriori. In this case, the authentication management entity has access to the information in respect of location of the requesting entity which has used the authenticatable transmission copy to obtain one or more authenticated copies according to the modalities defined previously. This information is used by the authentication management entity when the latter is in a position to produce a new authenticated copy on the basis of an original document attached to the reference original document, in the case where this authenticated copy has not or could not be produced previously and when the latter must be delivered to the requesting entity. In this case, when the authentication management entity detects the new availability of authenticated copies and if the requesting entity is still authorized to receive this type of document, then the authentication management entity will automatically dispatch to the requesting entity:

Either an authenticated copy of the new original documents in the appropriate paper and/or electronic form by any tailored pathway (email, fax, teleprinting, downloading, etc.)

Or an item of information indicating the availability of these new original documents, this item of information being transmitted in any admissible form (email, traditional mail, SMS, updating of a database, etc.). The requesting entity can then access these new original documents through a specific access, whose definition accompanies the item of information transmitted, or which is already known by the requesting entity, either by performing a new reproduction of the "initial authenticatable transmission copy if the latter is still at the disposal of the requesting entity, or on the basis of one of the authenticated copies already obtained if the latter are also authenticatable copies.

Obtaining of an authenticated copy with attachment of transaction: in this case, in addition to the authenticated copy obtained or independently of the obtaining of the latter, the requesting entity has the possibility of dispatching information detailing a current, past or forthcoming transaction whose requesting entity is payee, this information is then transmitted to the authentication management entity via a tailored authentication delivery system so as to be associated with the associated original document on the basis of the authenticatable copy owned by the requesting entity.

Modulating any obtaining previously defined to a limited period. Thus the authenticated requests to copy can be delivered by the authentication management entity only in a period defined by the owning entity i.e. by definition of a start date and/or of an end date and/or of a duration or any equivalent definition allowing the definition of such values. These limits may be defined for any type of obtaining of copy which is authenticated on the basis of the authenticatable transmission copy or specifically for one or more types of obtaining, the owning entity thus being able to define as many periods as necessary.

Modulating any obtaining defined previously as a function of the requesting entity which asks for an authenticated copy on the basis of the authenticatable transmission copy produced. Thus the requesting unit will be able to specify that the authenticatable transmission copy produced does not make it possible to obtain all or some of the modes of obtaining authenticated copy at one or more types of organization and/or at one or more specific organizations. The types of organizations may thus be:

One or more types of organizations, these types may be in a nonlimiting manner; public administrations, banks, Insurance companies, etc.

One or more specifically determined organizations, i.e. for example a combination of one or more organizations such as indicated hereinafter:

a particular bank or merely a department of the latter or indeed an agency or a particular service or a particular individual or any combination of these entities, The tax administration, or a department or service of this administration and/or a local delimitation of the latter. Or any combination of these entities Modulating the production of any or of certain authenticated copies produced with respect to the original document of which they are the copies by:
  Deleting certain information or areas of the document produced,
  Modifying characteristics such as deleting color, replacing image or logo, modifying resolution or format,
  Adding specific information to the copy produced such as the date and indications of the possibilities and limits of use within the framework of the obtaining of authenticated copies.
Defining a total or partial traceability of any authenticated delivery of copy obtained on the basis of the authenticatable transmission copy produced or of any other authenticatable copy produced on the basis of the latter or of a particular subset of these authenticated copies. This traceability may be passive, that is to say consisting in the storage of information that can be consulted a posteriori either by the owning entity, or by the issuing entity or by any other entity. This traceability may be active, that is to say all the information independently of its possible storage is dispatched to the owning entity and/or to the issuing entity and/or to any other entity in a manner optionally synchronized with their creation. The traceability may also combine active traceability and passive traceability. The traceability may be defined with or without limitation over time, with a limitation or otherwise of the types of the authenticated copies and/or of the authenticatable copies produced.
Optionally having the possibility of being able to interrupt the delivery of all or some of the authenticated copies and/or authenticatable copies that can be produced on the basis of the authenticatable transmission copy produced as well as on the basis of all or some of the authenticatable copies produced on the basis of the transmission copy. Within this framework, this interruption can give rise to the dispatching by the authentication management entity of the corresponding item of information to any "requesting entity having this authenticatable transmission copy or an authenticated copy obtained on the basis of the latter in the case where this interruption decided by the owning entity has an impact on the possibilities of obtaining of new authenticated copies for these requesting entities.

FIGS. 3B to 3G illustrate the process of creating an authenticatable transmission copy on the basis of a key for access to the original according to various cases characterizing the key for access to the original. All these figures comply with FIG. 3A.

FIG. 3B illustrates the process of creating an authenticatable transmission copy on the basis of an authenticatable ownership copy in the form of a material document. For this figure, the authenticatable transmission copy is produced destined for the owning entity which is in charge of its transmission to the requesting entity.

Within this framework, the key for owner access to the original is an authenticatable ownership copy in the form of a material document, the owning unit can then use a tailored reproduction system to obtain an authenticatable transmission copy. The owning entity submits its authenticatable ownership copy to a copy as it would do with a document that was not an authenticatable copy. When a copy is requested from a tailored reproduction system, the latter searches for the possible sensitive character of the document submitted for reproduction by searching for the marks therein. When this is the case, the document submitted is considered to be sensitive, which within the framework of our invention signifies that the document is an authenticatable copy. If the tailored reproduction system has the capacity to process other types of sensitive documents such as for example confidential documents, the authenticatable copy nature of the document submitted for reproduction is determined solely after utilization of the rules except in the case of use of a type of marks that is specific to the authenticatable documents.

When the character of authenticatable copy is identified by the tailored reproduction system according to the above modalities, the tailored reproduction system proposes to the owning unit on the basis of the document submitted to obtain one or more authenticatable copies and one or more authenticated copies in addition to or in place of the optional conventional copy initially requested. If the owning entity validates the obtaining of authenticated copy(copies) and/or of authenticatable copy(copies). The tailored reproduction system, if it has not yet done so, searches for and extracts the rules of the authenticatable ownership copy used so as to ascertain the possibilities and restrictions of obtaining authentication on the basis of this document optionally modulated by its context of use. The context of use can include the geographical and temporal elements of the request as well as the identity elements of the requester. The tailored reproduction system then initiates a computerized dialog with the owning entity so as to define the copy or copies to be produced. With respect to the figure explained here, the owning unit can thus define the obtaining of an authenticatable transmission copy. However, outside of the framework of this figure, it can on the basis of its authenticatable ownership copy obtain in addition to or in place of this authenticatable transmission copy any copy or any combination of copies within the limits defined implicitly or explicitly by the rules of the authenticatable ownership copy used.

According to a particular embodiment of the invention, the computerized dialog proposed by the tailored reproduction system with a view to obtaining one or more authenticated copies and/or one or more authenticatable copies is initialized only after searching for and extracting the rules of the authenticatable ownership copy and a first appropriate utilization of them.

According to a particular embodiment of the invention, the user can make a request for an authenticatable copy or an authenticated copy independently of the identification by the tailored reproduction system of its sensitive character and/or of its authenticatable document character. In this case, the tailored reproduction system commences the digitization of the document presented with a view to its reproduction and searches for the presence of marks making it possible to confirm this sensitive character and/or this authenticatable document character. If the latter is not confirmed the user's request is rejected and the tailored reproduction system provides an appropriate diagnosis to the user. If marks are detected and they are compatible with the request, the reproduction system searches for and extracts the rules of the document presented. These marks are compatible if they identify the document as a sensitive document and in the case of a definition of several types of marks that the mark detected can be associated with authenticatable documents. On completion of the detection of compatible marks, the tailored reproduction system can directly perform the search for the rules and/or provide a tailored diagnosis tailored to the user and/or institute a new dialog of computerized type with the latter so as to supplement and/or confirm the reproduction request.

According to a particular embodiment, any conventional copy obtained on the basis of a copy authenticatable on the basis of a tailored reproduction system is produced while deleting all or some of the marks and rules of the authenticatable copy presented so that inter alia the copy produced cannot be used as an authenticatable copy.

When the owning unit recovers the authenticatable transmission copy or copies requested in the form of a paper document and/or electronic document, it concerns itself with transmitting it to the requesting unit either by dispatching a conventional mail or by direct handover in the case of a paper document or by electronic pathway such as an email in the case of an electronic document.

FIG. 3C illustrates the process of creating an authenticatable transmission copy on the basis of an authenticatable ownership copy in the form of a material document. For this figure, the authenticatable transmission copy is directly produced destined for the requesting entity.

Within this framework, the method described in the previous figure remains valid, however the authenticatable transmission copies are directly transmitted to the requesting unit either directly by the tailored reproduction system, or by the authentication management entity (transmission not represented in the figure for the sake of clarity) or by any other entity able to collaborate with the latter entity.

FIG. 3D illustrates the process of creating an authenticatable transmission copy on the basis of an authenticatable ownership copy in the form of an electronic document. For this figure, the authenticatable transmission copy is produced destined for the owning entity which is in charge of its transmission to the requesting entity. This figure is an adaptation of FIG. 3A to this particular configuration.

Within this framework, the key for owner access to the original is an authenticatable ownership copy in the form of an electronic document, the owning unit can then use tailored reproduction software to obtain an authenticatable transmission copy, in this case the tailored reproduction software strings together the same processing operations as the tailored reproduction system as indicated for FIG. 3B by tailoring its mode of detection of the marks and rules to the electronic nature of the document which incorporates them.

FIG. 3E illustrates the process of creating an authenticatable transmission copy on the basis of an authenticatable ownership copy in the form of an electronic document. For this figure, the authenticatable transmission copy is directly produced destined for the requesting entity.

Within this framework, the key for owner access to the original is an authenticatable ownership copy in the form of an electronic document, the owning unit can then use tailored reproduction software to obtain an authenticatable transmission copy, in this case the tailored reproduction software strings together the same processing operations as the tailored reproduction system as indicated for FIG. 3C by tailoring its mode of detection of the marks and rules to the electronic nature of the document which incorporates them.

FIG. 3F illustrates the process of creating an authenticatable transmission copy on the basis of an access to the original. For this figure, the authenticatable transmission copy is produced destined for the owning entity which is in charge of its transmission to the requesting entity.

Within this framework, the key for owner access to the original is an access to the original, the owning entity then uses a tailored remote access system. The latter then proposes to the owning unit the same options as the tailored reproduction system or the tailored reproduction software when they have determined the authenticatable character of the document submitted for reproduction such as defined in what was disclosed for FIGS. 3B and 3D.

As in the previous cases, the simple ownership of access to the original may suffice for its owner to authorize same to solicit the tailored remote access system. This possibility may however is subordinated to a complementary identification, thus any complementary item of information directly or indirectly detailing the requester could be asked for. In addition to the previously defined modes of identification, the owning unit will be able to identify itself via the use of information contained in the access to original in its possession. The latter mode will itself be able to be combined with the other previously defined modes of identification.

Moreover, in this case the access to the original being able to be associated a particular original document or with a set of original documents, the computerized dialog proposed to the owning unit will be able to be tailored to this plurality of original documents. In the methods associated with the previous FIGS. 3B to 3E, the tailored reproduction system or the tailored reproduction software will also be able to propose one or more authenticated copies and/or one or more authenticatable copies of original documents other than that associated with the authenticatable copy presented but while complying with the implicit or explicit limitations and restrictions attached to the authenticatable copy presented. Within the present framework, in the absence of formal presentation of authenticatable copy to establish the request, the latter will be modulated as a function of the characteristics of the access to the original used which will be able to depend only on the characteristics of the owning entity.

FIG. 3G illustrates the process of creating an authenticatable transmission copy on the basis of an access to the original. For this figure, the authenticatable transmission copy is directly produced destined for the requesting entity.

Within this framework, what was defined for FIG. 3F applies, the authenticatable transmission copies are directly transmitted to the requesting entity by the tailored remote access system or by the authentication management entity or any other entity collaborating with these entities.

FIG. 4 illustrates the process of creating an authenticated copy. In this case, the requesting entity undertakes a request with the authentication management entity via a tailored authentication delivery system by using the authenticatable copy in its possession or which has been entrusted to it momentarily by the owning entity. It is also possible to design circuits for disseminating the authenticatable copy between the owning entity and the requesting entity which is more complex or involving other parties, but this does not modify the principle of the method.

In this figure, the owning entity is not solicited outside of the initial provision of the authenticatable transmission copy to the requesting entity. However, it may intervene after the dissemination of the authenticatable transmission copy by using its key for access to the original to modify or delete the possibilities of obtaining authenticated copies and/or authenticatable copies on the basis of this authenticatable transmission copy, within the limits of what is permitted to it and of what has been defined by the various entities involved in this method in relation to the reference original and the various authenticatable copies produced on the basis of the latter. One of the major benefits of the invention is that the requesting entity can obtain directly, on the basis of the authenticatable transmission copy with which it will have been provided definitively or momentarily by the owning unit, an authenticated copy in a direct link with the authentication management entity in accordance with modalities imposed in advance by the owning entity or a posteriori.

This original mode of delivery of an authenticated copy makes it possible to guarantee the requesting entity possession of a copy with a full guarantee of authenticity, including subsequent to its receipt while not exceeding the confidentiality limits defined by the owning entity.

Figure 5:
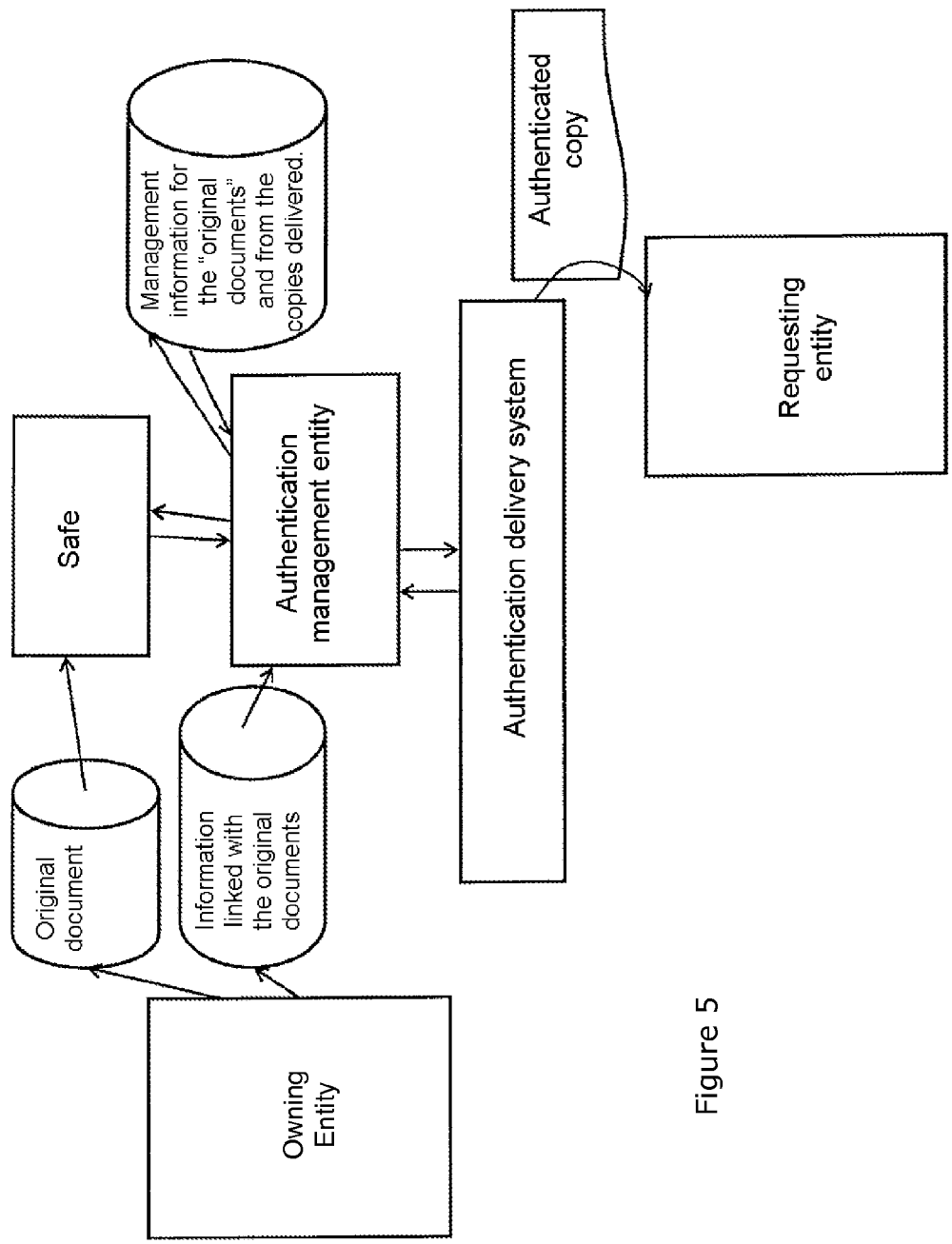

It is possible to enrich this figure by adding the dispatching of a notification to the owning entity each time, or only in certain cases to be defined, that an authenticatable transmission copy produced under control of the owning entity or that an authenticatable copy produced on the basis of the latter allows the delivery of an authenticated copy and/or of an authenticatable copy, including when this delivery is performed subsequent to the direct use of the authenticatable transmission copy as will be defined in the description linked with FIG. 5.

To obtain an authenticated copy on the basis of the authenticatable transmission copy which has been entrusted to it, the requesting entity submits this authenticatable transmission copy to an authentication delivery entity while requesting a copy or if the tailored reproduction system so allows while directly requesting an authenticated copy.

The modalities of processing of the authentication delivery entity as a function of the type of document processed paper document or electronic document and according to the various types of system able to correspond to the definition of an authentication delivery entity in the case of processing a request for reproduction based on an authenticatable transmission copy are identical to those defined for the same type of reproduction on the basis of an authenticatable ownership copy. The differences result simply from the limitations and restrictions of reproduction which differ in the two cases.

By making its request for reproduction with an authentication delivery entity on the basis of its authenticatable transmission copy, the requesting entity can make all or some of the following requests, on initialization of the reproduction process or during the latter or by successive steps throughout the latter as a function of the possibilities of definition offered by the authentication delivery system in relation to the implicit or explicit utilization of the rules of the authenticatable transmission copy submitted to the reproduction process.

Within this framework, the authentication delivery entity can propose a computerized dialog to the requesting entity to construct its request in one or more steps. This dialog can request an identification on the part of the requesting entity so as inter alia to provide a means of delivery of these copies and/or of information about their immediate availability or a posteriori being able to include in a nonlimiting manner a simple or multiple definition of physical and/or electronic and/or telephonic address, a connection definition (login).

The request thus expressed can comprise all or some of the following elements:
  Obtaining of a simple authenticated copy: i.e. the possibility of obtaining an authenticated copy of the reference original document directly associated with the authenticatable transmission copy,
  Obtaining of any authenticated copy produced on the basis of another original version of the reference original document associated with the authenticatable transmission copy,
  Obtaining of any authenticated copy produced on the basis of any other original variant and any connected original document associated with this same reference original document.
  Obtaining a posteriori of the reproduction process in the course of any authenticated copy being able to be obtained on the basis of the authenticatable transmission copy used, the list of these copies can be defined by the requesting entity in an implicit manner or in an explicit manner by adapting to the corresponding computerized dialog proposed by the authentication delivery entity.
  Obtaining of an authenticated copy with attachment of transaction: in this case, in addition to the authenticated copy obtained or independently of the obtaining of the latter, the requesting entity has the possibility of dispatching information detailing a current, past or forthcoming transaction whose requesting entity is payee, this information is then transmitted to the authentication management entity via the tailored authentication delivery system so as to be associated with the associated original document on the basis of the authenticatable transmission copy owned by the requesting entity or with any other original document being able to be associated with it by the authentication management entity. This attachment of transaction may be flawed in the following cases:
    When the authentication management entity detects in the management information linked with the associated original document an information item incompatible with the transaction to be recorded, this may be the case in particular when a concurrent transaction has already been recorded on the same original document by another entity,
    When the requesting entity during its reproduction operation in view of the information which will have been transmitted to it by the authentication management entity during the computerized dialog established with the authentication delivery system solicited, judges that this information is not compatible with the transaction currently being recorded or that the latter must be suspended pending complementary information.

If the rules of the authenticatable transmission copy owned by the requesting entity authorizes it implicitly or explicitly, this copy can then be used as an authenticatable ownership copy and the requesting entity can then by thus becoming virtually an owning entity request the obtaining of authenticatable transmission copies for other entities which are potentially as many new requesting entities.

FIG. 5 illustrates the possibilities of updating the information linked with the already issued original documents. All the actions thus described can also be executed by any other entity having the implicit or explicit authorization to intervene on the management of the original documents issued by the issuing entity and/or on any other original document linked with these documents.

The issuing entity can dispatch to the authentication management entity so as to store in the safe any new original document linked with the reference original document, i.e. chiefly:
  Any original document which is another original version of the reference original document,
  Any original document which is another original variant of the reference original document,
  Any original document which is an original document connected with the reference original document, According to a particular embodiment of the invention, some of these new original documents can be stored outside of a safe and are then considered to be information linked with the (reference) original document.

In parallel with this dispatching or independently, the issuing unit dispatches to the authentication management entity any useful information and/or any information relating to:
  original documents already dispatched to the authentication management entity, original documents stored in a safe not managed by the authentication management entity, original documents not yet existing or having been destroyed, This information dispatched to the authentication management entity may be in a nonlimiting manner with respect to the set of the previously defined original documents including the reference original document and any other original document that may be associated therewith:

Any contextual information linked with these original documents as well as any modification or deletion of such information already transmitted, Any definition of official recipient of these original documents as well as any modification or deletion of such information already transmitted, Any definition of contractual framework of these original documents as well as any modification or deletion of such information already transmitted, Any definition of referencing of other original documents linked with these original documents as well as any modification or deletion of such information already transmitted, Any constraint of dissemination of these original documents as well as any modification or deletion of such information already transmitted.

FIG. 6 illustrates the scheme for encoding the rules on an authenticatable copy so as inter alia to optimize its processing by a tailored mobility interface.

Thus, a rule consists of a set of information of computing type that can be encoded by a binary coding i.e. a succession of 0 and of 1. There obviously exist numerous types of encoding that can satisfy the encoding of rules such as for example a ternary encoding (succession of 0, 1 and 2) as well as any encoding or combination of encodings that can be processed by a computerized intelligence. In the case where the rules would make do with referencing a document, or at the very least a particular authenticatable copy of a document, it is possible to estimate for a user population on earth of 2 billion people, the potential of dissemination of about 10 authenticatable copies per year. This gives us for a period of 20 years, a potential of $4*10^8$. This coding requires a succession of 5 bytes, which together with complementary encryption and redundancy bytes (to satisfy the validity of the decryption) gives us a total of 10 to 15 bytes. The rule thus obtained can be decomposed into a certain number of sub-sequences, two, three or more. The compilation of at least one occurrence of each sub-sequence making it possible to reconstruct the whole of the rule without presaging reading consistency checks that can be performed as a supplement. A sub-sequence can indeed be validated only if a minimum of a certain number of occurrences is decoded successfully.

In FIG. 6, we have assumed that a rule was able to be decomposed into three sub-sequences and that the encoding capacity on a line of text makes it possible to encode at least three sub-sequences by line. If the sub-sequences are thus dubbed SS1, SS2 and SS3. It is possible to encode them in the following order:

Lines 1 and 1 modulo 3 (i.e. lines 4, 7, 10 etc.), the sub-sequences are coded in the order SS1, SS2 and SS3 while leaving at the ends of the line and between these codings an uncoded blank space depending on the space available.

Lines 2 and 2 modulo 3 (i.e. lines 5, 8, 11, etc), the sub-sequences are coded in the order SS2, SS3 and SS1 while leaving at the ends of the line and between these codings an uncoded blank space depending on the space available.

Lines 3 and 0 modulo 3 (i.e. lines 6, 9, 12, etc), the sub-sequences are coded in the order SS3, SS1 and SS2 while leaving at the ends of the line and between these codings an uncoded blank space depending on the space available.

A suite of sub-sequences SS1, SS2 and SS3 is thus obtained, sufficient to reconstruct a complete rule in any elementary text space (horizontal partial extraction, vertical or skewed). This disposition is obviously given by way of example, any other decomposition into sub-sequences of rules and disposition in space allowing easy reconstitution in numerous cases of partial extraction is also satisfactory.

The distribution of sub-sequences of rules in the document does not disturb the processing with a view to obtaining authenticatable copies and/or authenticated copies via a tailored reproduction system or tailored reproduction software which can readily tailored their detection algorithm to the search for a set of occurrences of sub-sequences of rules and of their compilation instead of the direct search for a certain number of occurrences of complete rules. On the other hand, this original arrangement is particularly tailored to the processing of copies authenticatable by a tailored mobility interface as indicated by the description of the following figures.

FIG. 6 illustrates on the basis of a disposition of sub-sequences of rules in accordance with the description of FIG. 5 the compatibility of this encoding with a photo shot via a tailored mobility interface.

Thus if the photo of the document is sufficiently large, in numerous cases it will incorporate at least one occurrence of each sub-sequence of rules, i.e. in our illustration the sub-sequences SS1, SS2 and SS3. The photo shot can then be driven by specific software which will optimize the snapshot parameters or indeed perform the image corrections necessary to allow decoding of each sub-sequence included in the photo shot taken while including therein optional checks of validity of the decoding performed if the encoding so allows. This software can optimize the photo shot by introducing information redundancy by in fact taking several photos in a certain time span, preferably short. The mutualization of the images allows the person skilled in the art to introduce algorithms making it possible to deduce with better accuracy the graphical reality of the processed document and consequently to obtain more accurate decoding of the sub-sequences of rules.

On the basis of this decoding of the sub-sequences of rules and of the corresponding reconstitution of the complete rule, the tailored mobility interface can thus propose the obtaining of authenticatable copies and/or authenticated copies as allowed by tailored reproduction software or a tailored reproduction system.

FIG. 7 illustrates on the basis of a disposition of sub-sequences of rules in accordance with the description of FIG. 5 the compatibility of this encoding with a video scan via a tailored mobility interface.

Thus if a sufficiently wide scan is performed on a sufficiently long portion of the document, in numerous cases it will incorporate at least one occurrence of each sub-sequence of rules, i.e. in our illustration the sub-sequences SS1, SS2 and SS3. This scan thus created a certain number of elementary images, i.e. in general more than twenty images a second for a freely flowing video. These images in the current state of the art are in general of worse quality than a photo image, but the technical characteristics are evolving very rapidly and in the near future it is likely that each elementary image of a video shot will be of quality at least equal to current photo shots. This video shot can then be driven by specific software which will optimize the snapshot parameters or indeed perform the image corrections necessary to allow decoding of each sub-sequence included in each of the elementary images of the video shot while including therein optional checks of validity of the decoding performed if the encoding so allows. This software can also exploit the multiplicity of the images taken to construct one or more resulting images of better quality by introducing a processing of redundancy information. The mutualization of the images allows the person skilled in the art to introduce algorithms making it possible to deduce with better accuracy the graphical reality of the document that formed the subject of the shot seen and consequently to obtain more accurate decoding of the sub-sequences of rules.

On the basis of this decoding of the sub-sequences of rules and of the corresponding reconstitution of the complete rule, the tailored mobility interface can thus propose the obtaining of authenticatable copies and/or authenticated copies as allowed by tailored reproduction software or a tailored reproduction system.

In conclusion, the method according to the invention makes it possible to authorize the real or virtual possessor of an authenticatable copy to transmit all or some of the present or future information attached to this document in accordance with constraints that it will be able to define and control accurately. The invention makes it possible to endeavor to ensure that the constraints defined are complied with in any use by a third-party of the documents and/or information transmitted.

With respect to a solution according to the prior art, essentially geared toward the securing of the transmission and sealing, the invention allows flexible transmission, geared toward final authentication.

The original is no longer submitted directly to a reproduction process but only authenticatable copies are defined which will allow the circulation of authenticated information between three parties.

The invention claimed is:

1. A method for authenticating a document using an authenticable copy of the document to obtain an authenticated copy of the document, the authenticatable copy possessed by an owning entity and comprising rules which directly or indirectly define conditions for obtaining the authenticated copy, said rules being detectable and utilizable by a tailored reproduction system and being tailored to one of a material document type and an electronic document type, the method for authenticating a document comprising:
creating an original of the document in electronic document form by an issuing entity;
the issuing entity sending the original of the document in electronic document form to an authentication management entity so that the original of the document in electronic document form is stored in a secure storage site and so that delivery of the authenticated copy is managed directly or indirectly by the authentication management entity;
sending an authenticatable ownership copy of the original of the document to an owning entity, wherein the authenticatable ownership copy serves as a key for the owning entity to access the original of the document in electronic document form stored in the secure storage site;
upon a request for the authenticated copy by a requesting entity to the owning entity, the owning entity makes, on the basis of the authenticatable ownership copy, a request for reproduction of the original of the document via a tailored reproduction system controlled directly or indirectly by the authentication management entity so as to obtain an authenticatable transmission copy of the original of the document, the conditions for obtaining the authenticated copy, on the basis of the authenticatable transmission copy, being defined by the owning entity;
the authenticatable transmission copy is transmitted, directly or indirectly, by said owning entity to said requesting entity; and
the requesting entity uses the authenticatable transmission copy to make a request for reproduction of the original of the document via the tailored reproduction system so as to obtain the authenticated copy delivered under the direct or indirect control of the authentication management entity.

2. The authentication method as claimed in claim 1, wherein a key for access to the original of the document serves as a substitute for the authenticatable ownership copy for the owning entity to access the original of the document in electronic document form stored in the secure storage site.

3. The authentication method as claimed in claim 2, wherein creation of the key for access to the original of the document is unsynchronized with creation of the original of the document, such that the key is creatable prior to creation of the original of the document.

4. The authentication method as claimed in claim 3, wherein creation of the key for access to the original of the document occurs prior to creation of the original of the document, and the original of the document is generated by the issuing entity in collaboration with at least one other entity or non-collaboratively by the at least one other entity.

5. The authentication method as claimed in claim 1, wherein, during the sending of the original of the document in electronic document form to the authentication management entity, in a synchronized manner or not, an authenticatable ownership copy is sent to the owning entity.

6. The authentication method as claimed in claim 1, wherein the owning entity defines the conditions for obtaining the authenticated copy as a function of the choices thereof and/or of requests of the requesting entity.

7. The authentication method as claimed in claim 1, wherein the authenticatable transmission copy comprises at least one mark allowing the tailored reproduction system to detect the authenticatable character of said authenticatable transmission copy.

8. The authentication method as claimed in claim 7, wherein the at least one mark is used to characterize, in addition to the authenticatable character of said authenticatable transmission copy, documents for which the authentication method has not been used.

9. The authentication method as claimed in claim 7, wherein the at least one mark is a graphical element when the authenticated copy is the material document type.

10. The authentication method as claimed in claim 7, wherein the at least one mark and/or the rules of the authenticated copy of the electronic document type is materialized by one or more attributes of computing type.

11. The authentication method as claimed in claim 7, wherein printing an authenticated copy in electronic form produces an authenticated copy in hardware form without use of a specific printing process, wherein the at least one mark and the rules being transposed to the authenticated copy in hardware form by the printing process.

12. The authentication method as claimed in claim 7, wherein printing an authenticated copy in electronic form produces an authenticated copy in hardware form with use of a specific printing process which allows a tailored transposition of the at least one mark and rules of the electronic document in electronic form to the authenticated copy in hardware form.

13. The authentication method as claimed in claim 7, wherein at least one of the marks and/or at least one of the rules is materialized by one and the same element of the authenticated copy in the case where the processing linked with each of the at least one of the marks and/or the at least one of the rules can be differentiated.

14. The authentication method as claimed in claim 1, wherein at least one type of mark defines the authenticatable character of said authenticatable transmission copy.

15. The authentication method as claimed in claim 1, wherein the rules include information for processing by an algorithm so as to allow the algorithm to respond to the request for the authenticated copy.

16. The authentication method as claimed in claim 1, wherein the rules include referencing information for ascertaining previously stored information associated with the original of the document so that the authenticated copy is produced within the limits and restrictions attached to the original of the document.

17. The authentication method as claimed in claim 1, wherein the rules are defined in a manner complementary to references already present on the original of the document.

18. The authentication method as claimed in claim 1, wherein the rules define the conditions for obtaining the authenticated copy either in an autonomous manner or in coordination with complementary information accessible by the authentication management entity whether or not this information has been created by this entity.

19. The authentication method as claimed in claim 1, wherein the rules include a graphical element when the authenticated copy is the material document type.

20. The authentication method as claimed in claim 19, wherein the digitized authenticatable transmission copy is analyzed by a telephone, a digital tablet or a digital personal assistant so as to detect the presence of at least one of the rules.

21. The authentication method as claimed in claim 1, wherein the authenticatable transmission copy does not comprise the set of the data present on the original of the document.

22. The authentication method a document as claimed in claim 21, wherein the telephone, the digital tablet or the digital personal assistant performs an authenticatable copy request.

23. The authentication method as claimed in claim 1, wherein the authenticatable transmission copy comprises data not present on the original of the document.

24. The authentication method as claimed in claim 1, wherein the authenticatable transmission copy is digitized by a photographic apparatus of a telephone, a digital tablet or a digital personal assistant.

25. The authentication method as claimed in claim 1, wherein the conditions for obtaining the authenticated copy are modifiable by the owning entity after the creation of the rules.

26. The authentication method as claimed in claim 1, wherein events relating to an authenticatable copy are archived.

27. The authentication method as claimed in claim 1, wherein the authenticated copy includes a computer type screen.

28. The authentication method as claimed in claim 1, wherein the authenticated copy includes supporting hardware.

29. The authentication method as claimed in claim 1, wherein the detection by the authentication management entity of a multiplicity of material copies of one and the same authenticatable copy gives rise to tailored security measures relating to the dissemination of authentication linked with this authenticatable copy.

30. The authentication method as claimed in claim 1, wherein accessing the original of the document is equivalent, in terms of capacity for obtaining the authenticated copy, to an authenticatable ownership copy.

31. The authentication method as claimed in claim 1, wherein as a supplement to the original of the document associated with the authenticated copy, other original documents are associated therewith, these other original documents being limited to data of computing type.

32. The authentication method as claimed in claim 1, wherein the rules are an information item which are superimposed on the text in accordance with elementary variations of the characteristics of the latter.

33. The authentication method as claimed in claim 1, wherein the rules are decomposed into a predefined number of sub-sequences so as to facilitate their dispersal in the document and their utilization.

34. The authentication method as claimed in claim 33, wherein the sub-sequences of the rules are inserted into the document so as to optimize the possibility that at least one utilizable occurrence of each sub-sequence is present on a photo shot or a video scan performed by a tailored mobility interface.

35. The authentication method as claimed in claim 1, wherein the authenticated copy is provided to the requesting entity subsequent to the use by the latter of its authenticatable transmission copy.

36. The authentication method as claimed in claim 1, wherein the requesting entity has a transaction recorded in association with the original of the document by using authenticatable transmission copy.

37. The authentication method as claimed in claim 1, wherein the authentication management entity arbitrates conflicts of use of the original of the document via the requests for reproduction on the basis of multiple authenticatable transmission copies which are submitted whether or not these requests associate transactions with the requested copies.

38. The authentication method as claimed in claim 1, wherein characteristics of an authenticatable transmission copy in terms of obtaining an authenticated copy are modifiable by any entity subsequent to creation of the authenticatable transmission copy.

* * * * *